United States Patent [19]

Koopman, Jr. et al.

[11] Patent Number: 5,377,270

[45] Date of Patent: Dec. 27, 1994

[54] CRYPTOGRAPHIC AUTHENTICATION OF TRANSMITTED MESSAGES USING PSEUDORANDOM NUMBERS

[75] Inventors: Philip J. Koopman, Jr., Hebron; Alan M. Finn, Amston, both of Conn.

[73] Assignee: United Technologies Automotive, Inc., Dearborn, Mich.

[21] Appl. No.: 85,423

[22] Filed: Jun. 30, 1993

[51] Int. Cl.5 .............................................. H04L 9/00
[52] U.S. Cl. ...................................... 380/25; 380/21; 380/23; 380/46; 380/48; 380/49; 340/825.31; 340/825.34
[58] Field of Search ................... 380/4, 21, 23, 24, 25, 380/30, 43, 46, 48, 49, 50; 340/825.31, 825.34

[56] References Cited

U.S. PATENT DOCUMENTS

| | | | |
|---|---|---|---|
| 3,622,991 | 11/1971 | Lehrer et al. | 340/825.31 |
| 4,424,414 | 1/1984 | Hellman et al. | 380/30 |
| 4,758,835 | 7/1988 | Rathmann et al. | 340/825.31 |
| 4,876,718 | 10/1989 | Citta et al. | 380/42 |
| 5,109,152 | 4/1992 | Takagi et al. | 380/23 X |
| 5,144,667 | 9/1992 | Pogue, Jr. et al. | 380/25 X |
| 5,146,215 | 9/1992 | Drori | 340/825.32 |

OTHER PUBLICATIONS

E. Kranakis, *Primality and Cryptography;* Sect. 4.1, pp. 98–99; (John Wiley & Sons, 1986).

*Primary Examiner*—Bernarr E. Gregory
*Attorney, Agent, or Firm*—M. P. Williams

[57] ABSTRACT

An automobile door lock receiver module (30) and a plurality of keychain fob transmitter units (16) contain identification numbers, secret initial values, and secret feedback masks so as to authenticate encrypted messages from any of the assigned fobs, indicative of commands registered by closing switches on the fob. Each fob is synchronized with the receiving module by means of a truly random number concatenated with a secret initial value and encrypted, through a linear feedback shift register or other operations. A second secret initial value is encrypted and command bits are exclusive ORed into the low order bit positions; the two encrypted numbers are concatenated and encrypted to form a key word which is transmitted with the fob ID. Synchronization includes decrypting to recover the truly random number and the secret initial value concatenated therewith; the truly random number is compared with previously received random numbers in order to avoid copying of recently transmitted synchronization commands. Successive lock-related commands utilize the number encrypted from the truly random number and the second secret initial value as starting values, employing a pseudorandom number of encryption iterations. A half-second delay between responses mitigates gaining access through numerical trials. An authenticated panic alarm command operates the headlights and horn of the vehicle but does not alter the synchronization.

40 Claims, 9 Drawing Sheets

RCVR

RCVR

FOB – ENCRYP

FOB - ENCRYP

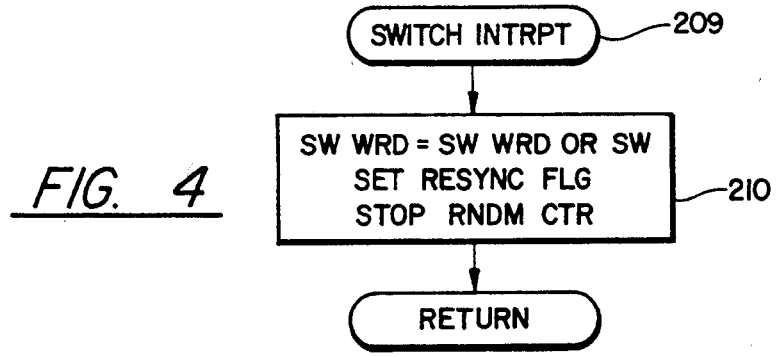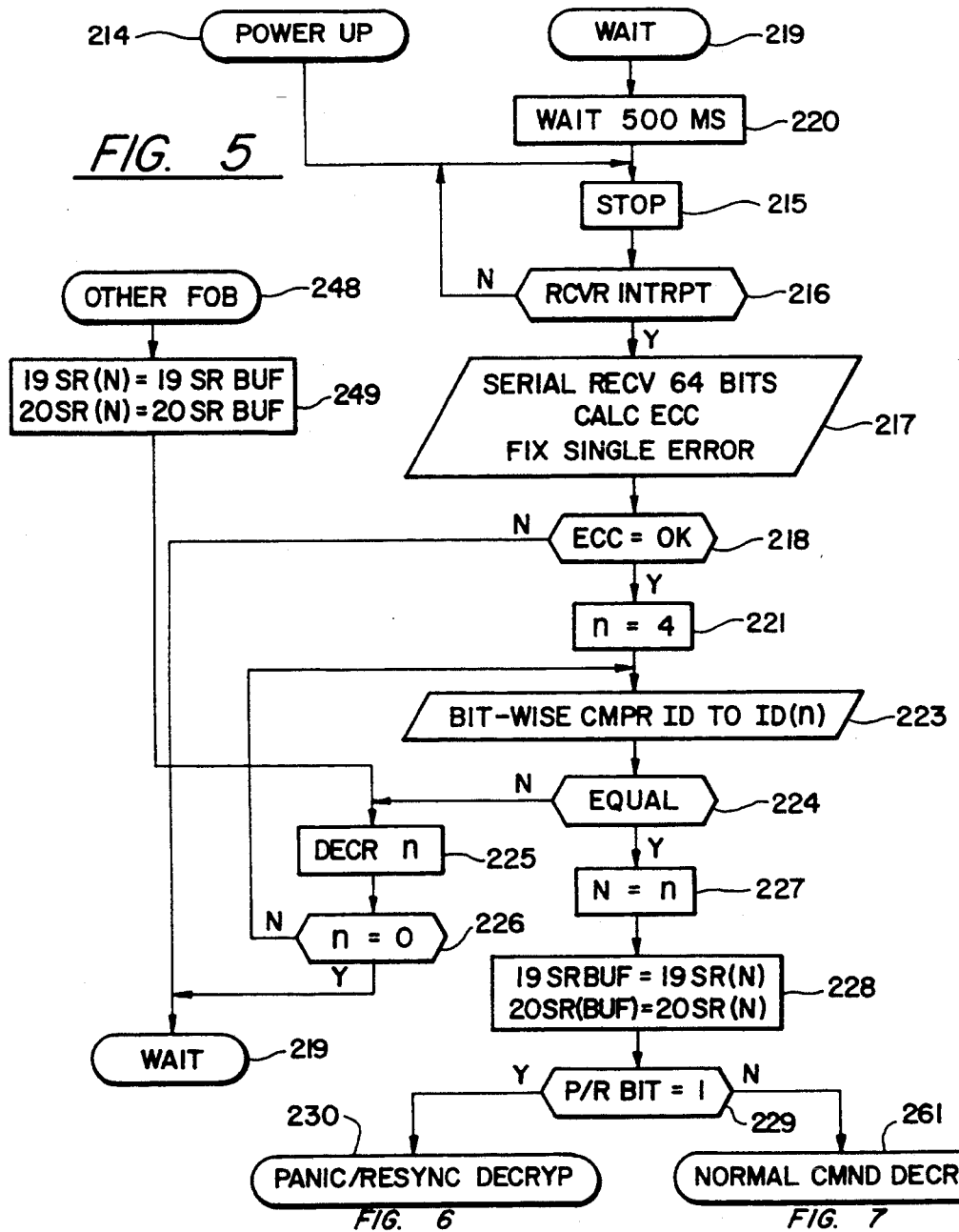

CRYPTOGRAPHIC AUTHENTICATION OF TRANSMITTED MESSAGES USING PSEUDORANDOM NUMBERS

TECHNICAL FIELD

This invention relates to cryptographically encoded transmissions such as the type involved with an automobile key chain fob transmitter which opens the automobile door locks or trunk in response to transmissions from the fob.

BACKGROUND ART

The art of encoding transmissions so that the transmissions may be authenticated at a receiving module must meet criteria for technical viability (security) as well as low cost and convenience. The cost and convenience criteria result in an inability to use any encoding with polynomials of excessive degree (such as binary numbers of hundreds of bits). Furthermore, cryptographic processing must require less than one second for acceptability by the user. Cost and weight constraints can limit the size and sophistication of a microprocessor or other signal processing equipment used in the system.

An example of such a system is disclosed in commonly owned U.S. Pat. No. 5,191,610 to Hill and Finn. That system utilizes linear feedback shift register pseudorandom number generation having the same seed number and the same, fixed feedback mask in the receiver as in the transmitter. The number of iterations of linear feedback shift register pseudorandom number generation are counted in both the receiver and the transmitter, there being one additional iteration each time that a command is sent. Should the receiver not recognize one of the transmissions (because the transmitter was inadvertently activated at a great distance from the receiver, or otherwise), the receiver is allowed a moderate number of catch-up iterations in which it attempts to match the received transmission. Should that fail, the transmitter tells the receiver how many iterations from the seed it should perform in order to recreate a new current pseudorandom number in order to resynchronize the receiver to the transmitter pseudorandom number.

The aforementioned system requires that a receiver and a transmitter be wired or loaded with a binary feedback mask at the factory and sold as a pair. It also precludes matching a replacement transmitter with an existing receiver without the involvement of dealership personnel, which could compromise security.

Any such system, except one that uses a truly random number of infinite degree, can be compromised either by analysis of a succession of intercepted signals, or by a brute force, exhaustive numerical trial approach which simply tries every number possible as the authentication word (the code or key).

Coded keypads used for unlocking vehicles have inherent security features. The generation of the code word by pressing keys can be shielded from view, and is certainly not capable of being determined beyond a line of sight. Furthermore, there would be great risk for an intruder entering every possible number into a keypad in an attempt to replicate the code (unless, of course, the automobile were parked in an unobservable area, such as a private or otherwise vacant garage). Thus, the keypad cannot be breached by analysis, and is not likely to be breached by numerical trial.

In contrast, lock systems which employ remote transmissions are enormously subject to security tampering because the surveillance of the transmissions may be carried out in another vehicle, without attracting any attention whatsoever. Therefore, it is possible to record many transmissions to a given vehicle, such as in a reserved workplace parking space (which commonly contains expensive cars), as well as providing an unobservable opportunity to attempt the breach of a security system (or even several systems at one time) by broadcasting huge volumes of random numbers, in parking lots where vehicles remain for long periods of time, such as at airports.

Whenever a transmitter is newly assigned to be used with an existing receiver, it is not sufficient to allow the new fob to identify itself and become authorized, without limiting that activity to a time when there is authorized access to the receiver through other than the transmitter itself (that is, within the vehicle itself). Thus, access to the vehicle by means of a traditional key or the like assures the safety of matching a newly assigned transmitter to an existing receiver. In the case of loss of synchronization between the transmitter and the receiver, simply allowing the receiver to synchronize to a particular pseudorandom number provided thereto by the transmitter makes it too easy for a surreptitious breach of security based on the analysis of a few transmissions, and synchronizing thereafter to one of the previous transmissions, utilizing numbers expected to be successful based upon analysis. Mere obfuscation of the resynchronizing code could be compromised by analysis of successful resynchronizations, and determination of the obfuscation function. The danger here is not just that a single car might be broken into, but that a sophisticated capability might be developed and thereafter utilized extensively to breach the security of a large number of automobiles of a similar type.

DISCLOSURE OF INVENTION

Objects of the invention include provision of an improved remote operating system, the security of which is extremely difficult to breach by analysis, in which analysis of transmitted signals provides essentially no assistance in reducing the amount of numbers required for a numerical trial breach of security, and which is useful only on a per vehicle basis.

The invention is predicated on the reversibility characteristic of the well-known exclusive OR operation. The invention is further predicated on the reversibility of encryption, such as encryption involving linear feedback shift register operations.

According to the invention, cryptographic authentication between a transmitter and a receiver includes a word encrypted from the concatenation of a truly random number with a shared secret initial value; decryption in the receiver recovers the concatenation from the received word; and the secret initial value portion is compared with a corresponding secret initial value portion of the recovered concatenation in the receiver. According further to the invention, if the portions are identical, the purely random number portion is compared with previously received random number portions, authentication being effected by successful comparison of the secret initial values and lack of comparison between the random numbers portions, thereby defeating any attempt to replicate a recent transmission.

In still further accord with the present invention, the transmitted word is derived by performing an encryption, such as a linear feedback shift register pseudorandom number generation operation, on a word including the aforementioned encrypted concatenation in turn concatenated with another number.

In further accord with the invention, a word encrypted from the concatenation of a truly random number with a secret initial value is used as at least a portion of the authentication word established by cryptographically resynchronizing a transmitter to a receiver.

In accord with the invention, a number to be encrypted into a key word may have command bits exclusive ORed into some of the bit positions thereof; the commands are recovered by exclusive ORing an identical number with the decrypted key word; the command bits may identify a synchronization operation, a panic alarm or a lock-related command. According to the invention further, command bits indicative of a command to be performed by a receiving module are provided by being exclusive ORed into a portion of a word which is encrypted for transmission to the receiving module and are recovered from the decrypted word by it being exclusive ORed with an identical portion in the receiving module.

According to the invention, words utilized in cryptographic authentication of transmissions include command-indicating bits exclusive ORed into a command portion thereof. In further accord with the invention, the non-command portion of a decrypted word is compared with a corresponding portion of a word in the receiver, for authentication, and if successful, the remainder of the word in the receiver is exclusive ORed with the command portion of the decrypted word in order to recover the command to be performed.

According to the invention, cryptographic resynchronization of a receiver to a transmitter is conditioned upon cryptographic authentication of the resynchronization message.

According to the invention, one command sets off the lights and horn or other alarm on an automobile, and that command does not depend upon nor alter the cryptographic synchronization between the receiver and transmitter.

The invention may be used in cryptographically authenticated systems other than automobile lock systems.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 4 is a logic flow diagram of a switch interrupt subroutine which may be utilized in the present invention.

FIG. 5 is a logic flow diagram of a first portion of a receiver decryption routine according to the invention.

BEST MODE FOR CARRYING OUT THE INVENTION

Figure 1:
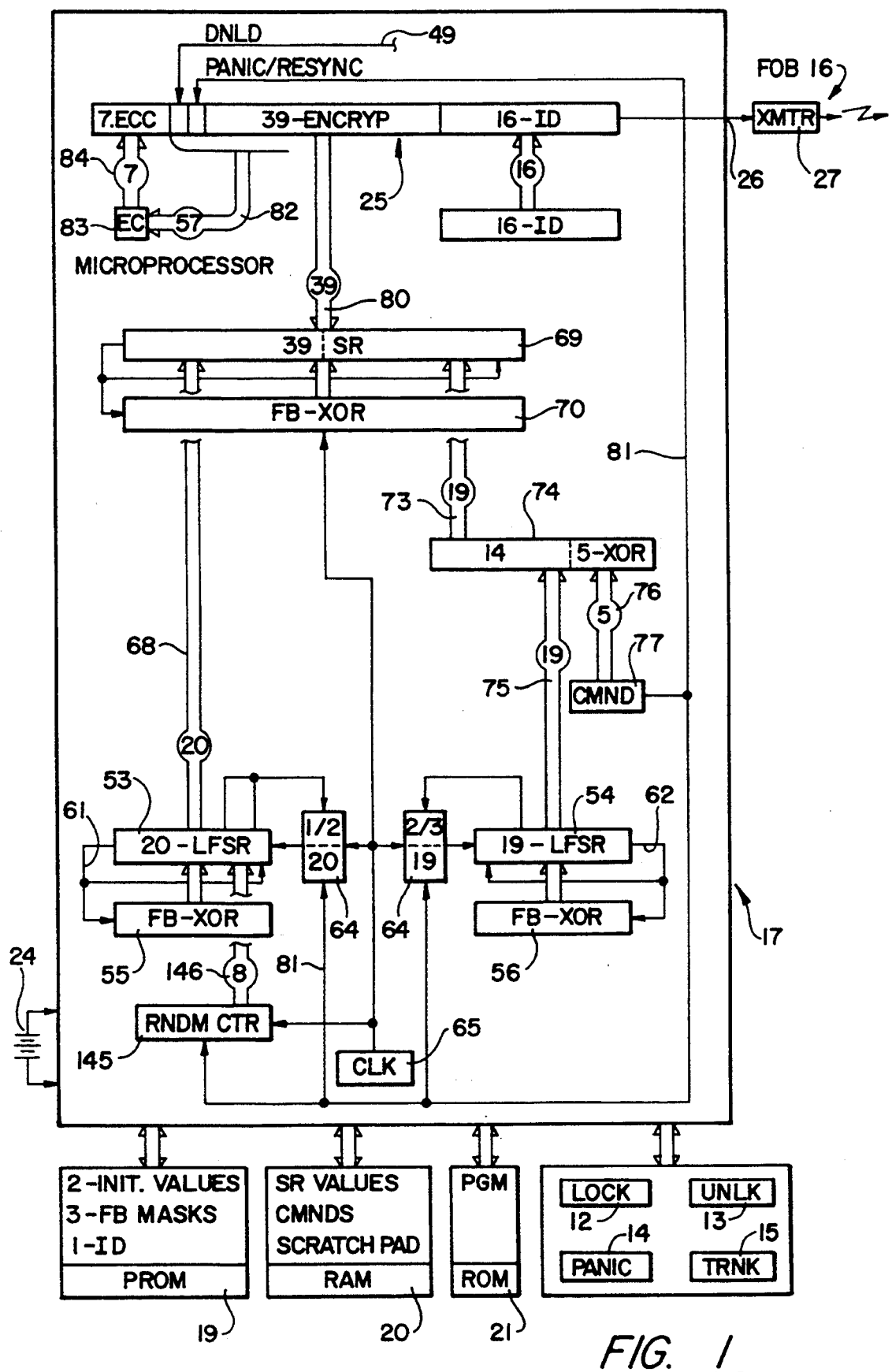
FIG. 1 is a stylized, simplified schematic block diagram of a transmitter according to the invention.

One example of the present invention is its use in a remote, encrypted automobile door and trunk locking and unlocking mechanism. The command to perform a certain task, such as a lock-related command (lock or unlock the doors, release the trunk), or to operate the lights and the horn or other alarm on the automobile in the event of a panic situation, or to cause cryptographic synchronization or resynchronization between the transmitter and the receiver module in the automobile, are under control of a plurality of buttons 12–15 disposed on a keychain fob or other hand-held transmitter unit shown in FIG. 1. The switches 12–15 may be tactile or touch-type and feed a microprocessor 17 which is associated with a PROM 19, a RAM 20 and a ROM 21. The PROM 19 is programmable only once, capable of having one set of output/input relationships burned therein, as is well known in the art. Typically, upon manufacture, each fob 16 will have its PROM burned in so as to establish a 16 bit identification number, which is not protected as secret information, as is described more fully hereinafter; two secret initial (seed) values from which encrypted messages are originated; and three secret feedback masks defining suitable polynomials for feedback exclusive ORing in the encryption process, for the life of the fob, all as is described hereinafter. The RAM 20 is used as a scratch pad memory, in the usual way, and will contain changing values of the shift registers and commands, as described hereinafter. The program for the microprocessor 17 is contained in the ROM 21.

It is assumed that the microprocessor 17 is the type which has a stop mode in which the clock does not run, and the only function that the microprocessor can perform is to respond to an external interrupt, which in this case would be the closure of one of the switches 12–15. This keeps power consumption extremely low, and a suitable battery 24 could last about five years. The microprocessor 17 assembles a 64 bit command request word 25 which is applied serially over a line 26 to a suitable transmitter 27 (e.g., RF or infrared), which serially transmits the command request, as digital bits or otherwise, a suitable distance, such as not more than 10 meters. The fob 16 will, before beginning its useful life, be associated with a particular automobile along with up to three more fobs (in the example herein) so as to form a set of up to four fobs, any one of which can operate the locks or the panic alarm of a related receiver module 30 in an automobile or other secured enclosure. The receiver module 30 in the automobile includes a receiver 31 which receives the serial bits and applies them over a line 32 to a microprocessor 33, where the 64 bit word 25 is replicated in a 64 bit word 38. The microprocessor 33 is powered from the automobile battery system 39. The microprocessor 33 has an electrically erasable PROM 40, a RAM 41 and a ROM 42 associated therewith. Each fob 16 is associated with a module 30 at a dealership, so that lost fobs may be replaced and matched to the module 30 anytime. A 64 bit word 25 (FIG. 1) is formulated with each fobs' ID, secret initial values and masks, and a download signal is provided, in some fashion, by factory personnel on a line 49. This may be achieved by a jumper, or in any other suitable way, since it does not pose a security threat unless the receiver 30 is tampered with simultaneously, which can be avoided as described below. The 64 bit word 25 sent to the receiver module 30 during a download includes one bit indicating the download operation. The presence of the download bit in the 64 bit word 38 (FIG. 2) can result in a download signal on a line 50 provided that the auto receiver 30 has been put into a download condition, such as by the installation of a download jumper 51 or other security measure. When download is suitably indicated, the fob ID and two initial values from the PROM 19 will be stored in the electrically erasable PROM 40. Then two secret feedback masks, of the same bit length as the initial values, will be sent with the ID in a similar fashion; and finally, a feedback mask which is as long as the concatenation of the two initial values is sent from the PROM 19 to the EE PROM 40 in the auto receiver 30. In a similar fashion, the initial values, feedback masks and ID's of three other fobs (in this example) will be loaded into the auto receiver 30 during valid download operations.

Figure 2A:
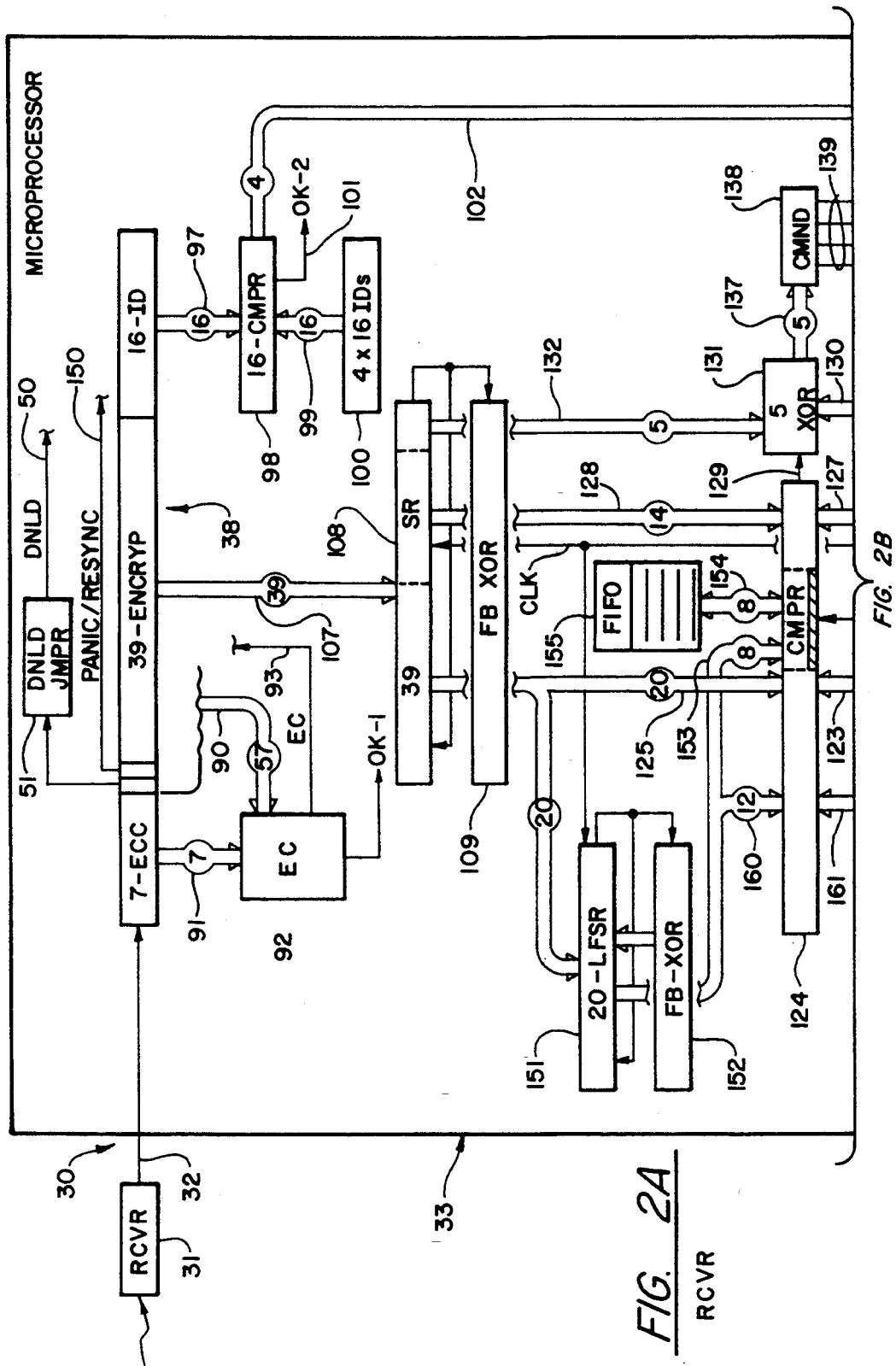
FIG. 2 is a stylized, simplified schematic block diagram of a receiver according to the invention.
Figure 2B:
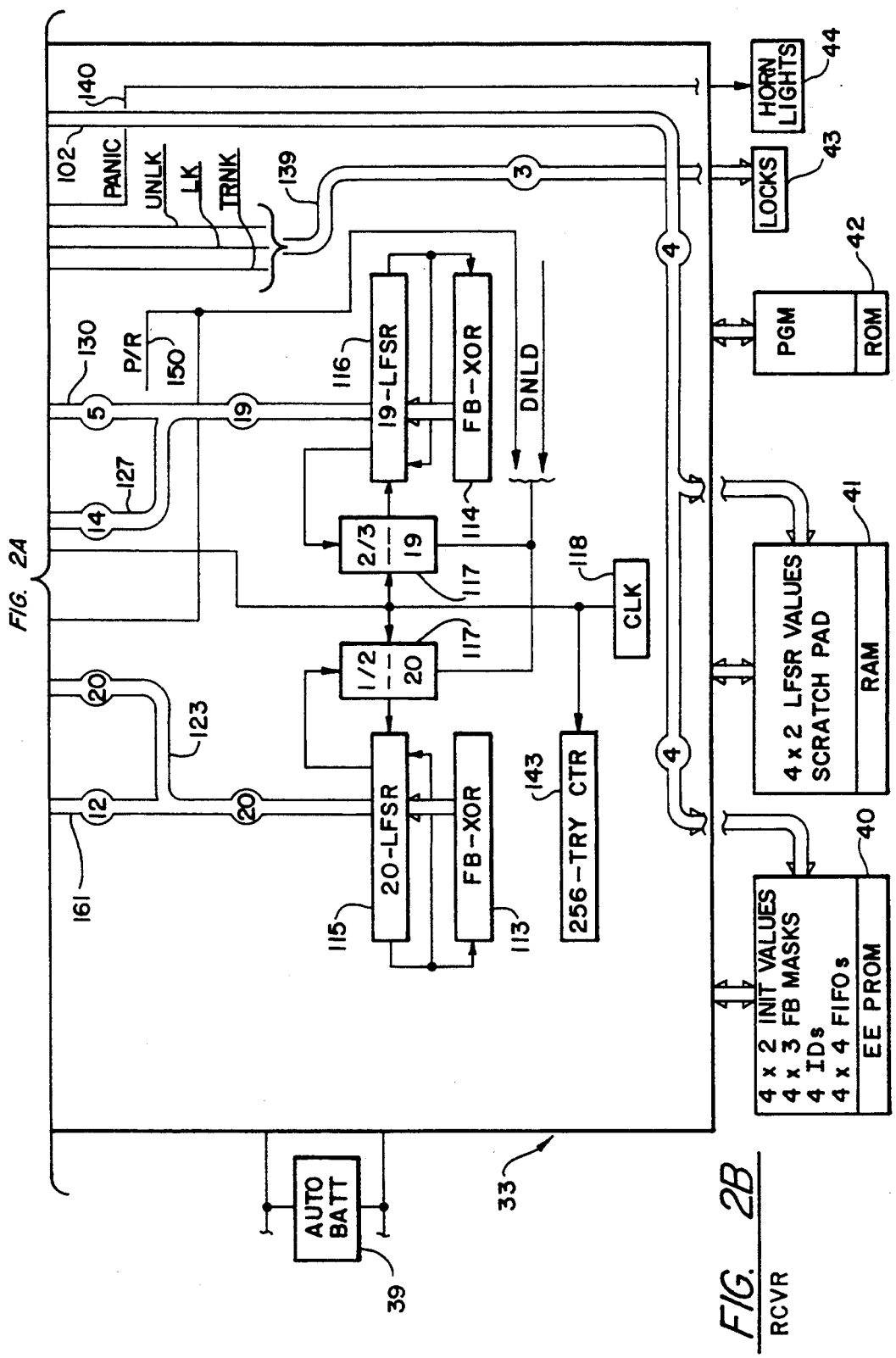

The word 25 appears in FIG. 1 to be within a special 64 bit register. However, the word 25 actually appears in various parts of the RAM 20, in addresses designated to be used for holding the parts of the outgoing, serially transmitted word. Similarly, all of the apparent hardware within the microprocessor 17 is merely illustrative of processes and relationships, which may indeed be performed by hardware which resembles that illustrated in FIG. 1, or may be implemented, as is preferred, by processing of bits utilizing the RAM 20 as a scratch pad memory, by means of software which is well within the skill of the art in the light of the teachings which follow hereinafter.

The microprocessor 33 has functions and processes illustrated therein which may either be hardware or software, as described with respect to FIG. 1 hereinbefore.

The narrative with respect to FIG. 1 is of a form describing hardware: software implementation of the invention is described with respect to FIGS. 3–7, hereinafter.

The receiver module 30 is connected to the locks 43 of the automobile, as well as to the automobile horn and lights 44, or other suitable alarm arrangements on the automobile.

Before a fob can be utilized to operate the locks or alarms on an automobile, synchronization must occur. Herein, this is also referred to as resynchronization since it is utilized at different times during the life of the system, as described hereinafter. This resynchronization process is described hereinafter; suffice it at this point to say that the process will begin with the two secret initial (seed) values for the fob 16 located in a 20 bit linear feedback shift register (LFSR) 53, and a 19 bit LFSR 54, and suitable feedback masks for each of the LFSRs 53, 54 available at the input of corresponding feedback exclusive ORs 55, 56. The initial synchronization (an initial resynchronization command) includes 20 iterations of the shift register 53 and at least 19 iterations of the shift register 54, so as to provide a complete bit-wise convolution. For ease in programming, both shift registers may be provided with 20 iterations during initialization (which is assumed herein). In each cycle, the high order bit is transferred by a line 61, 62 to the low order bit and is also exclusively ORed with those bits of the shift registers 53, 54 identified by bits in the feedback masks, to form the next higher order bits within the shift registers 53, 54. This is the very well known function of linear feedback shift registers, in the process of generating maximal length pseudorandom numbers, as described in *Numerical Recipes*, Press, Flannery, Teukolsky, and Vetterling; Cambridge University Press, Cambridge, Mass. (1986). The feedback mask has to represent a suitable polynomial so as to provide a maximal length code, having degree N, which repeats only after $2^N-1$ iterations. This is more fully set forth at pages 108–109 of *Error correcting Techniques for Digital communication*, Michelson and Levesque, John Wiley & Sons, New York, N.Y. (1985), and in Appendix C of *Error Correcting Codes*, Pederson and Weldon, MIT Press, Cambridge, Mass. (1972).

One embodiment herein uses linear feedback shift registers, in some cases modified to be non-linear feedback shift register systems by shifting a pseudorandom number of iterations as described hereinafter. However, other well-known pseudorandom number generation techniques may be used such as linear congruential pseudorandom number generators or nonlinear congruential pseudorandom number generators as more fully set forth in Chapter 3 of *The Art of Computer Programming*, Volume 2/Seminumerical Algorithms, ed. 2, Knuth, Addison Wesley, Reading, Mass. (1981); or inverse congruential pseudorandom number generators or generalized feedback shift register pseudorandom number generators as more fully set forth in Chapters 7, 8 and 9 of *Random Number Generation and Quasi-Monte Carlo Methods*, Niederreiter, SIAM, Capitol City Press, Montpelier, Vt. (1992); or multiplicative, I/P, power, discrete exponential, kneading map, shift register, or cellular automatic pseudorandom number generators as more fully set forth in "Pseudorandom Number Generators in Cryptography and Number Theory", J. C. Lagarias, pages 115–143 of *Cryptology and Computational Number Theory*, Pomerance, ed., Volume 42, Proc. SIAM (1990).

In general the pseudorandom number generator need not be reversible. A reversible generator is one where, given the current pseudorandom number and complete knowledge of the generation process, the previous pseudorandom number may be determined. For example, a linear feedback shift register pseudorandom number generator is reversible.

The manner in which the system is originally synchronized and the registers are made ready to operate is described hereinafter, because the general operation should be first understood.

In the usual case, when everything has been established and the system is operating normally, assume that a lock, unlock or trunk release command has been provided by pressing one of the buttons 12–15. This will cause the microprocessor 17 to wake up and perform one cycle of operation. In the cycle of operation, the RAM 20 provides the values which were previously left in the shift registers 53, 54 and the PROM 19 provides the masks for the shift registers 55, 56. Then, depending upon some pseudo-random event, such as the status of one or more bits of the shifts registers 53, 54, each of the shift registers will be provided one or two iterations or two or three iterations of linear feedback shifting due to the effect of clock gates 64 on the output of a clock 65. This is a first aspect of the present invention: instead of being shifted a number of times equal to the number of bits (which takes too many cycles to permit 256 attempts at decryption), the shift registers are only put through a few iterations after the initialization. Because this provides less scrambling of the feedback bits, the difficulty of mathematically ascertaining what the code might be is increased by causing the LFSRs to each undergo a different, variable number of iterations, in successive cycles, in a pseudo-random fashion. The pseudorandom number provided by the iterations of the shift register 53 is supplied over a trunk of 20 lines 68 to a 39 bit shift register 69. The shift register 69 is associated with feedback 70 in the same fashion as the LFSRs 53, 54, with the exception that the shift register 69 is loaded with new numbers before each cycle of shifting feedback iterations. In this sense, then, the shift register 69 and feedback operate more as a cyclic redundancy code generator. The other input to the 39 bit shift register 69 is a trunk of 19 lines 73 from a gate 74 that causes the low order 5 bits of the 19 bit LFSR 54 on a trunk of 20 lines 75 to be exclusive ORed with 5 bits on a trunk of 5 lines 76 from a command register 77. The command register 77 simply registers up to 32 commands encoded from the operation of any of the switches 12-15 (or fewer commands if some bits are used in a discrete fashion). Thus, in each cycle, there is presented to the 39 bit shift register 69 the outputs of the LFSRs with a command exclusive ORed in the low order bits of one of them. Then, the shift register 69 undergoes 39 iterations of LFSR-type feedback through an exclusive OR process 70, which utilizes a secret feedback mask provided by the PROM 19. This provides a full bit-wise convolution of the two words from the shift registers 53, 54, which is a cryptographic necessity. Use of the shift register 69 may be employed in prior art systems, such as the two-generator embodiment of the Hill and Finn patent. When the 39 iterations are complete, the result is an encrypted, key word provided on a trunk of 39 lines 80 to the 64 bit word 25, along with 16 fob ID bits from the PROM 19, a download bit 49 if appropriate, and a command flag such as a panic/resynch bit provided from the command register 77 on a line 81, when appropriate. In the usual case of authentication, both of the download and panic/resynch bits will be 0's. Then, all of these bits are monitored on a trunk of 57 lines 82 by an error correcting code circuit 83 to create a 7 bit error correcting code component on a trunk of 7 lines 84 for the 64 bit word 25; typically, a single error correcting, multi-error detecting code (such as a Hamming code) will be used. The illustrated embodiment of the invention uses a linear feedback shift register as a cyclic redundancy code generator for encrypting the input into a key word. However, any of several well-known reversible encryption techniques may be used. For instance, the McEliece error correcting code encryption; the RSA cryptosystem; discrete exponentiation cryptosystem; linear or non-linear, full length or truncated congruential cryptosystems; or the DES cryptosystem, as more fully set forth in Chapter 10 of *Contemporary Cryptology: The Science of Information Integrity*, Simmons, ed., IEEE Press New York, N.Y. (1992).

When the 64 bit word is fully assembled, it is transmitted serially (bit-by-bit) or otherwise, by any well-known technique, through the transmitter 27 to the receiver 31 of the receiver module 30 to become the 64 bit word 38 therein. All of the bits of the word 38 are applied over trunks of 57 lines 90 and 7 lines 91 to an error correcting and detecting process 92. If a single bit error has occurred, a signal on a line 93 (as appropriate) will correct the bit that is in error. If a multiple bit error is detected, the process is totally void, and the receiver module 30 simply goes into a half second wait state, which simply slows down any attempts to crack the code which is being used, as is described more fully hereinafter. If a multiple bit error has occurred but is not detected, the cryptographic authentication process will almost certainly fail. On the other hand, if the error correcting code shows that the 64 bit word 38 has no errors, then a first OK signal is provided on a signal line 94.

When it is believed that there are no errors in the 64 bit word 38, it is proper to determine whether the 16 bit, non-secret identification word matches any of the fobs that have been loaded into the receiver module 30. The ID of the fob reduces the probability that a command from a wrong fob will be cryptographically acceptable; it also reduces the amount of time it takes to iterate the code words in the receiver module to reach authentication (a match). However, in this embodiment, there is no restriction on which fobs are assigned as a group to an automobile, and it is assumed that there is approximately one chance in 11,000 that two fobs assigned to a particular automobile will have the same ID number. A feature of the invention is that if one fob with matching ID does not become authenticated, the receiver module 30 will see if there is another assigned fob with that same ID number, and if so, attempt authentication.

The 16 bit ID in the 64 bit word 38 is provided over a trunk of 16 lines 97 to a 16 bit compare circuit 98, the other inputs of which, on a trunk of 16 lines 99, are provided by the ID register 100, which really represents four different locations in the EE PROM 40, one for each associated fob. If, indeed, the message has come from one of the four associated fobs, a second OK signal appears on a line 101, and the identification number of the fob which has sent the message is provided on a trunk of 4 lines 102 to the PROM 40 and to the RAM 41 so as to utilize in the ensuing decryption process the secret mask for the selected fob and the two LFSR values which have previously been created for that fob. The previous LFSR values are utilized, rather than the initial secret values, because, according to the invention, the LFSR values are built upon, with only one, two or three iterations for each command received by the receiver module 30.

At this stage, the normal decryption process can begin. The 39 bit encrypted key word is provided over a trunk of 39 lines 107 to a 39 bit shift register 108 which can be identical in either structure or function to the 39 bit shift register 69 in the fob, except that it is iterated in a reversing process. The reversing process is easily understood, one bit at a time, by considering how the received 39 bits got to be what they were. In the last iteration between the shift register 69 and the exclusive OR circuit 70 (FIG. 1) if the high order bit (leftmost bit in FIG. 1) was a 1, then exclusive ORing in accordance with the secret mask is provided against each bit of given order in the 39 bit shift register in order to determine what the next bit in order would be at the end of the iteration. That is to say, the ninth bit becomes the tenth bit (0 or 1 as the case may be) unless it is inverted by the exclusive OR. In order to be inverted by the exclusive OR, the ninth bit of the secret mask would have to be 1, and the most significant bit at the start of the iteration would also have to have been 1; and the most significant bit advances to the least significant stage, in a wraparound. If either the most significant bit is a 0 or the corresponding bit in the secret mask is a 0, the ninth bit would simply advance into the tenth stage. Since what was the most significant bit becomes the least significant bit, inspection of the least significant bit determines whether or not exclusive ORing occurred. If the least significant bit in the shift register 108 is a 1, it is applied to exclusive OR the bits of each order with the same secret mask which was downloaded for this fob originally. For any bit (such as the ninth bit) for which there is a corresponding bit in the secret mask, whenever the lowest ordered bit at the start of the iteration is a 1, that bit will be inverted from 1 to 0 or from 0 to 1. But if there is no corresponding bit in the secret mask, then the bit in question is simply advanced to the next lower order stage (in the example here, bit 10 becomes bit 9) without being inverted. Or, if the least significant bit (the rightmost bit in FIG. 2) is a 0, then none of the bits are inverted as they are advanced from one stage to the next lower stage in the shift register 108. By doing this the same number of times (39 iterations in the example herein), the original word in the 39 bit shift register 69 is reconstructed. The operation of the 39 bit shift register is very much like cyclic redundancy code (CRC) generators, used for error detection and correction. The process in the 39 bit shift registers herein is the same as in the LFSRs with the exception of the fact that the shift registers herein receive a whole new starting word before the iterations of each cycle. More on CRCs, Galois field arithmetic, and the generation and utilization of pseudorandom binary numbers, may be found in *Theory and Practice of Error Control Codes*, Blahut, Addisson Wesley Pub. Company, Reading, Mass. (1984); *An, Introduction to Error-Correcting Codes*, Shu Lin, Prentice Hall, Englewood Cliffs, N.J. (1970); and *Error-Control Techniques for Digital Communication*, Michaelson and Levesque, John Wiley & Sons, New York, N.Y. (1985).

In decryption, part of the process is reversed, and part of it is matched. Thus, the 39 bit encrypted code word is reversed by 39 reversing iterations, and the results thereof are compared to what should be identical results from the LFSRs.

Once a fob is identified in the 16 bit compare circuit 98, its two secret feedback masks are loaded (from RAM 41) for use in corresponding exclusive ORs 113, 114, and its previously achieved 20 bit LFSR value is loaded into a 20 bit LFSR 115, while its previously achieved 19 bit LFSR value is loaded into the 19 bit LFSR 116. Dependent upon a given bit of each of the LFSRs, the LFSR is shifted (with or without exclusive ORing as described hereinbefore) either once or twice, in the case of the LFSR 115 or two or three times in the case of the LFSR 116 in dependence upon a pair of corresponding gates 117 which control the application of a clock 118 thereto, in the same fashion as described with respect to FIG. 1 hereinbefore. The 20 bits of the 20 bit LFSR 115 so generated are applied over a trunk of 20 lines 123 to a compare circuit 124, to be compared with 20 bits provided from the 39 bit shift register 108 over a trunk of 20 lines 125. Similarly, the high order 14 bits which are generated in the 19 bit LFSR 116 are provided by a trunk of 14 lines 127 to the compare circuit 124 for comparison with 14 bits of the 39 bit shift register 108 provided on a trunk of 14 lines 128. Assuming that both the 20 bit and 14 bit words compare properly, this signals a successful authentication on a line 129 and the receiver module 30 is allowed to receive and respond to the command made by the fob.

Recalling that the five bit command is exclusively ORed to the low order five bit positions provided from the 19 bit LFSR 54, the only way to recover those bits is to exclusive OR the low order 5 bit positions from the 19 bit LFSR 116 with the low order 5 bit positions of the reconstituted word in the 39 bit shift register 108. Therefore, the low order 5 bit positions produced by the 19 bit LFSR 116 are provided over a trunk of five lines 130 to a five bit exclusive OR circuit 131, the opposite inputs of which consist of the lowest order 5 bit positions from the 39 bit shift register 108 on a trunk of 5 lines 132. The result of the exclusive OR on a trunk of 5 lines 137 comprise the command which is stored in a command register 138. The typical commands provided on a trunk of lines 139 to the locks 43 comprise door unlock, door lock, and trunk release. Another command indicated by a signal on a line 140 may comprise a panic command which will cause the horn and lights 44 (or other alarms) on the car to scare away a loiterer as the driver approaches the car with the fob (as described more fully hereinafter).

If the first attempt to match the outputs of the LFSRs 115, 116 with corresponding 34 bits of the 39 bit shift register 108 fails, then the LFSRs 115, 116 are cycled again. In each cycle, the LFSR 115 will be shifted once or twice depending upon the random bit utilized as a control over its gate 117, and the LFSR 116 will be shifted two or three times in dependence on the random bit utilized to control its clock gate 117. This is to allow the receiver module 30 to catch up, in cycles, and therefore in iterations, to the status of the LFSRs 53, 54 in the fob 16.

Anytime that one of the buttons 12-15 on the fob is depressed, the fob will undergo one cycle, and the shift registers 53, 54 will undergo one or two, or two or three iterations, respectively. The pressings of the buttons 12-15 may occur simply by being crushed in a purse, children playing with the fob, or otherwise. Since each fob keeps its own LFSR generated numbers, and the receiver module 30 likewise maintains separate LFSR generated numbers for each fob, each fob will generally be able to track with the receiver module except for the inadvertent pressings of the switches 12-15. Whenever the switches 12-15 have caused a cycle that is not responded to by the receiver module 30, the first time the switches are pressed and the receiver module does respond, the content of the LFSRs 115, 116 will not compare with the corresponding bits of the 39 bit shift register 108. However, provision is made in accordance with the invention to allow the receiver module 30 to initiate additional cycles, and the additional one or two iterations for the LFSR 115 and two or three iterations for the LFSR 116, so as to catch up to the fob. To this end, an 8 bit counter 143 allows the receiver module 30 to try to catch up to the fob in question by repeating as many as 256 cycles, automatically. In a normal case, the receiver module 30 will catch up to the fob in only a few cycles. But if the receiver module is more than 256 cycles behind, as may occur by repetitive pressings of one of the switches 12-15 in a suitcase or handbag, then the LFSRs 115, 116 will not match up with the 39 bit shift register 108. The receiver module 30 is non-responsive to incoming signals while it is attempting authentication of a previous signal; the 256 attempts to catch up will transpire in only a half second or less; thus, authentication will not be hampered by repetitive pressing of the unlock button 13 due to impatience. Eventually, the operator will understand that the receiver module is out of synchronization (cryptographic synchronization), and will press two buttons at one time (such as lock and unlock), or some other combination that will be recognized in the fob as a command to effect cryptographic resynchronization between the receiver module 30 and the fob 16, as well as to reinitialize following a loss of battery power (dead or changed), which allows the RAM data to disintegrate.

A recognized command to synchronize ("resynch command", hereinafter) in the command generator 77 (FIG. 1) will produce the panic/resynch bit on the line 81. The resynchronization process in accordance with the present invention includes returning to the beginning; that is, returning to the use of the secret initial values and starting all over again. As described hereinbefore, the resynch command is used to initialize the units in the first place, and when they become out-of-synch, they are in a sense reinitialized just as when they are new. To that end, the panic/resynch bit on the line 81 will cause the two initial secret values to be loaded from the PROM 19 to the LFSRs 53, 54 and the two initial secret feedback masks to be made available to the exclusive ORs 55, 56, and the 39 bit secret feedback mask to be made available to the exclusive OR 70. The panic/resynch command on the line 145 causes the clocking gates 64 to cause 20 iterations, respectively, of the LFSRs 53, 54. The purpose is that, utilizing as many iterations as there are bits in the word, causes the maximal mix of the feedback, regardless of what the mask is, to assure complete bit-wise convolution. In this case, however, two additional changes from normal occur: the eight low order bit positions of the shift register 53 are provided with a truly random number on a trunk of 8 lines 146 from an 8 bit counter 145 which is allowed to respond to the clock 65 in a manner related to pressing of the buttons 12–15, as described with respect to FIG. 3 hereinafter. Since it is impossible for persons to depress buttons carefully enough to achieve other than a random number at computer clocking frequencies (500 KHz or more), the likelihood of this number being exactly the same in successive resynch processes is extremely small. After twenty iterations of feedback shifting, with the low order 8 bit positions of the LFSR 53 comprising those from the counter 145, outputs of the 20 bit LFSR 53 and the 19 bit LFSR 54 are provided to the 39 bit shift register 69. The shift register 69 thereafter undergoes 39 feedback shifting iterations, of the type described hereinbefore, to produce the 39 bit encrypted word in the 64 bit word 25. As before, the 16 bit ID for the fob is provided to the word 25, along with a panic/-resynch bit (described hereinbefore) to indicate that this is a panic or resynch request, and the error correction code is computed and the code bits added to the word 25 as described hereinbefore. The 20 bit LFSR and 19 bit LFSR results, after 20 iterations, form the pseudorandom starting words to be used in authenticating future transmissions.

In the receiver module 30, the first two steps are the same as in a normal command. Error correction is provided if possible, and if the word is correct, the first OK signal appears on the line 94. Then, the four possible IDs are compared with the incoming ID in the word 38, and if there is a match, the second OK signal appears on the line 101 and the signals on the trunk of four lines 102 tell the EE PROM 40 which fob is being worked with and therefore which of the sets of two secret initial values and three secret feedback masks should be utilized. The appropriate secret initial values and three feedback masks are loaded into the LFSRs 115, 116, and the exclusive ORs 113, 114 and 109. The content of the 39 bit shift register 108 is reconstructed by 39 reverse iterations, as described hereinbefore, so as to recover the word in the 39 bit shift register 69. However, since the output of the 20 bit LFSR 53 does not reflect 20 shift iterations of only the secret initial value that was placed therein, but rather represents 20 iterations of 12 high ordered bits of the secret initial value and 8 random low ordered bits, comparisons with the high order bits of the 39 bit shift register 108 cannot be made in the receiver module 30. Instead, the 20 bit LFSR value must be recovered in the same way that the 39 bit shift register value is recovered. That is, a reverse linear feedback shift register operation, utilizing the exclusive OR mask with the least significant bit, is achieved in a 20 bit LFSR 151 (FIG. 2) in association with a 20 bit exclusive OR 152. This restores the unscrambled number in which the 12 high order bit positions of the LFSR 151 should be the same as the 12 high order bit positions of the secret initial value in the 20 bit LFSR 115, and the low order 8 bit positions of the 20 bit LFSR 151 are some random number (produced by the counter 145).

The next step in the resynch process is to compare the high order 12 bit positions of the reconstituted word in the LFSR 151 with the 12 bits of the secret initial value of the 20 bit LFSR 115. Thus, the 12 bits on the trunk of 12 lines 160 are compared with the 12 bits on the trunk of 12 lines 161, which are created solely in response to the initial secret value. And, the 14 bits on the trunk of lines 127 are compared with the 14 bits on the trunk of lines 128; these should also compare because the 19 bit LFSR 116 has been passed through 20 iterations in response to its secret initial value so it should match the result in the 19 bit LFSR 54, the 14 high order bit positions of which have been reconstituted in the 14 bits of the 39 bit shift register 108 to which the trunk of lines 128 respond.

If both the 12 bit and 14 bit comparisons are successful, a determination is made whether the panic/resynch bit, provided on a line 150 from the 64 bit word 38, had been caused by a panic command or by a resynch command. If a resynch or panic command was sent, the resynch or panic command would have been exclusively ORed into the five low order bits of the 19 bit shift register 54, as described with respect to other commands hereinbefore. Therefore, the command will be extracted by the five bit exclusive OR 131 and provided over the trunk of lines 137 to the command register 138. Since performing the panic command cannot breach vehicle security, it is used as the default command; if the resynch command is not present on the line 140, then the panic/resynch command on the line 150 may be deemed to be a panic command, if desired, even if not decoded. Up to this point, the panic command and the resynch command are identical.

The next step in the resynch process is to compare the 8 bit random number in the low ordered bit positions of the 20 bit shift register 151 with the last four prior low order 8 bit random numbers received during resynchronizing. In the present invention, the random number is compared with the last four such random numbers previously received by providing the 8 low order bit positions of the 20 bit LFSR 151 on a trunk of 8 lines 153 to 8 bits of the compare circuit 124 which are also responsive to a trunk of 8 lines 154 from a first in, first out stack 155 (actually embodied in the EE PROM 40), which keeps track of the last four 8 bit random numbers received during resynchronization operations. If, during resynchronization, the 8 central bits of the compare circuit 124 compare with any of the four 8 bit words in the first in, first out stack (FIFO) 155, the operation is a failure, and the receiver module 30 reverts to a half second wait period before it will react to the next command (as described hereinafter) and the matched word goes to the head of the stack and remaining words in the FIFO are adjusted accordingly. On the other hand, if the 8 bit word on the trunk of lines 153 does not compare with any of the bits in the stack 155, the comparison is a success and the operation can proceed; additionally, the 8 bit word on the trunk of 8 lines 153 is applied over the trunk of lines 154 to the FIFO stack 155, for comparison with subsequent random 8 bit words during subsequent resynchronization operations. In such a case, the new word goes in the FIFO and the oldest word is dropped out of the FIFO.

Assuming that there is no match of the 8 bit random word, the resynchronization operation is complete. When the resynchronization is commanded, after successful comparisons of the 12 high order bits and the 14 bits as described hereinbefore and no comparison with the FIFO, the values established in the shift registers 53, 54, 115 and 116 are left as they are, for use in authenticating the next normal command cycle.

The panic command is the same as has been described with respect to the resynch command, except that, if the command register 138 produces the panic command signal on the line 140, the lights and the horn 44 (or other alarm) are operated, and, all of the LFSRs 53, 54, 115, 116 are then restored to whatever setting they had immediately before sending and receiving the panic command. The panic command operates differently from lock, unlock and trunk release commands, so that there will be response, even with total missynchronization between the fob and the receiver module. In the case of the panic command, starting over with the secret initial values ensures that authentication (to avoid nuisance responses) will be successful on the first try. Therefore, the panic command in the fob (FIG. 1) causes the LFSRs to be loaded with the initial values in the PROM 19, rather than the shift register values which had been achieved to date through iterations in the RAM 20, and the panic/resynch process just described is performed to ensure that there will be authentication to execute the panic command.

The foregoing description is given as if it were hardware, and indeed the invention may be implemented in hardware along the lines described hereinbefore. However, the invention has been implemented in suitably programmed microprocessors, which are deemed most suitable. In the flowcharts described hereinafter, exemplary software routines are illustrative of the processing of the invention, but not necessarily of the individual steps of the program in any given embodiment of the invention.

Figure 3A:
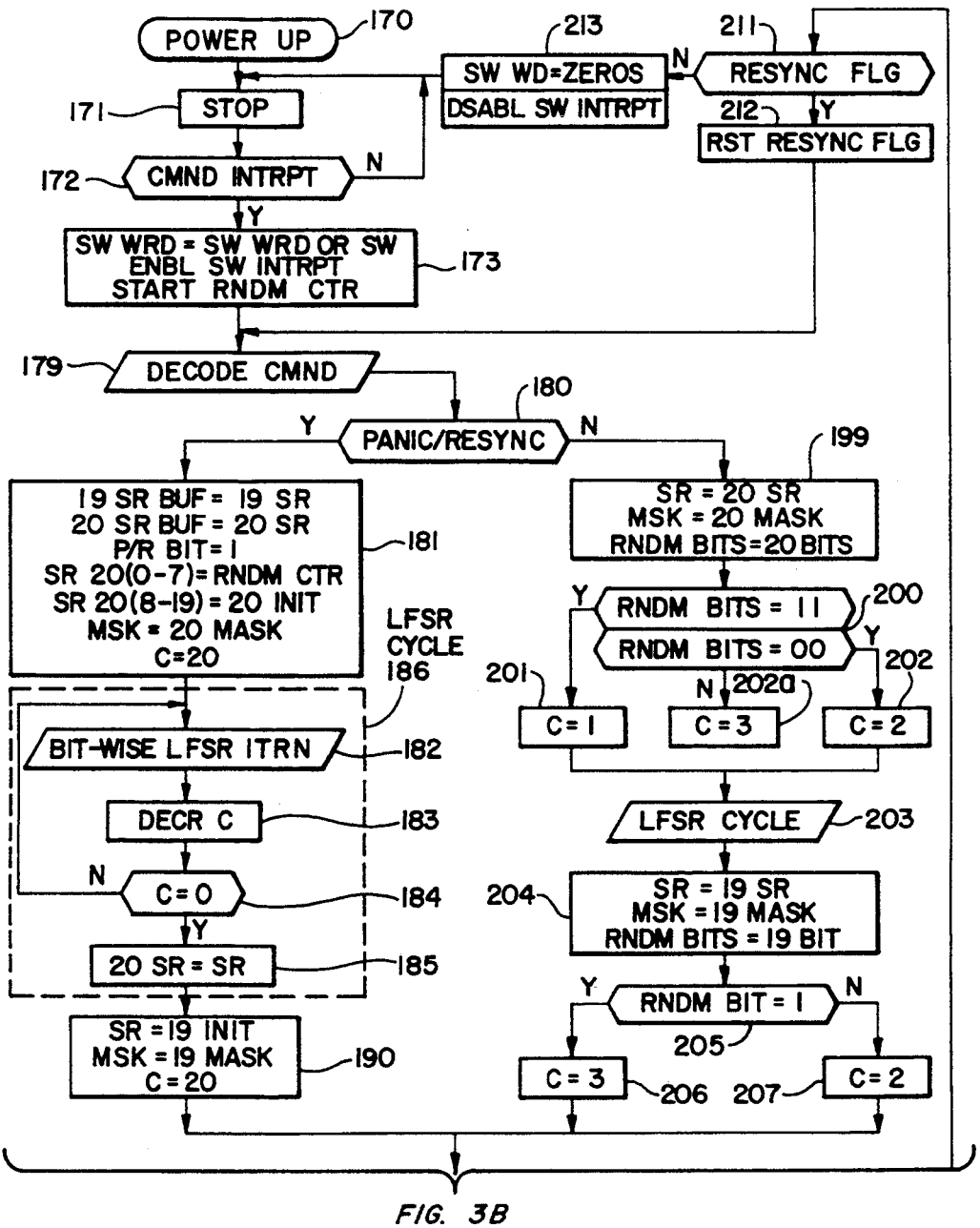
FIG. 3 is a logic flow diagram of a transmitter encryption routine according to the invention.
Figure 3B:
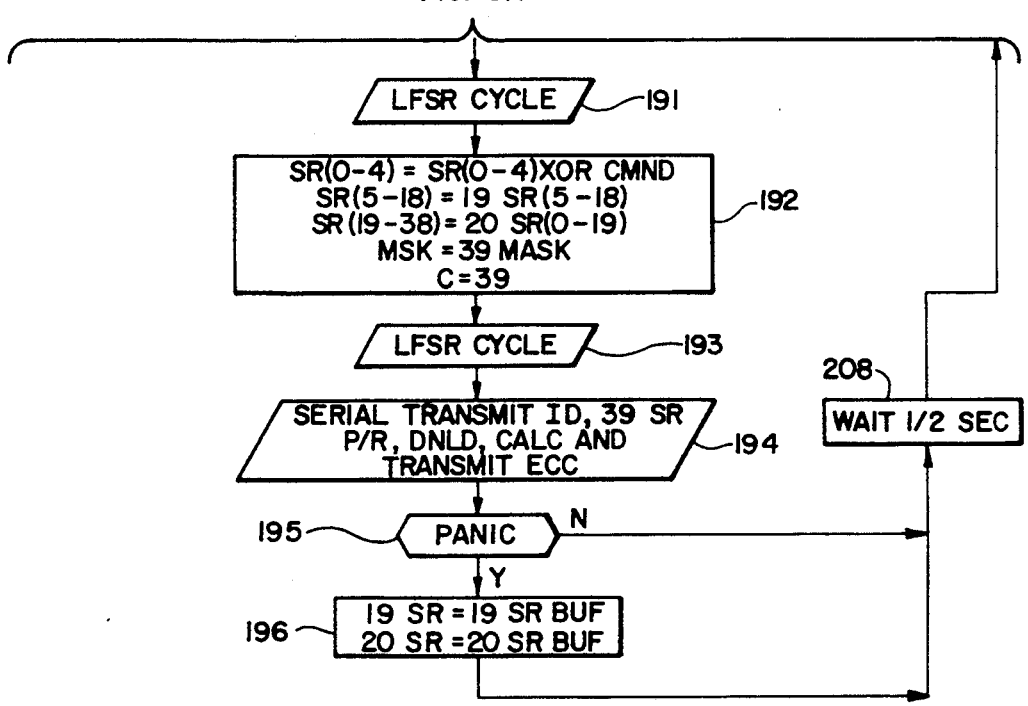

The process of encryption in the fob is illustrated in FIG. 3. It is assumed that the fob comprises a microprocessor, such as a 68HC11, which has a stop mode in which the clock is stopped, the power consumption is negligible, and the only thing the processor can do is to respond to an external interrupt to get started again. In such a processor, application of battery power would cause the program to be reached through a power up entry point 170 and the processor would immediately stop at a step 171 where the only function is to perform a test 172 to determine whether any of the buttons 12-15 have been pressed, or not. So long as no button is pressed, the processor waits in a low power stop mode, in the loop 171, 172. As soon as a key is pressed, an affirmative result of test 172 reaches steps 173 in which a switch word in RAM 20 is ORed with the one of the switches which was pressed. Generally, two switches cannot be pressed within a few computer clocks of each other, so the first one will be sensed. As described hereinafter, if a second one is pressed within about ½ to one second, it will be treated as paired-up with the first; if the two are correct (e.g., lock and unlock) a resynch command is declared. A switch interrupt, selectively enabled during normal command cycles only, allows sensing the second switch of a resynch.

In FIG. 3, the steps 173 also enable the switch interrupt and start the random counter. Then, a decode command subroutine 179 is performed and a test 180 determines if the command is either panic or resynch. If so, an affirmative result of test 180 reaches a series of steps 181 in which the shift register contents are saved in buffers, the panic/resynch (P/R) bit on line 81 is set to 1; a working register, herein referred to as a "shift register" (SR), is set with the random counter in its low order 8 bit positions and with the higher order bit positions equal to a 12 bit secret initial value for the 20 bit LFSR, the mask associated with the SR is set equal to the 20 bit secret feedback mask from the PROM 19, and a cycle counter C is set to 20 iterations. Then a bitwise linear feedback shift register iteration subroutine 182 is performed in which each bit is shifted to the next higher order position, with or without inversion, dependent upon the secret mask and/or whether the low order bit position has a 1, as described hereinbefore. Then the C counter is decremented in a step 183 and a test 184 determines if a complete, 20 iteration LFSR cycle has yet occurred. If not, another iteration is performed by the subroutine 182 and the C counter is decremented again. After 20 iterations, an affirmative result of the test 184 reaches a step 185 where the 20 bit shift register storage location in RAM 20 is set equal to the content of the working shift register. The steps and test 182-185 comprise an LFSR cycle 186.

Then the 19 bit shift register 54 is prepared in a series of steps 190 in which the content of the shift register is set equal to the content of the 19 bit secret initial value in the PROM 19, the mask associated with the shift register set equal to the 19 bit secret feedback mask in the PROM 19, and the C counter is set equal to 19. Then an LFSR cycle subroutine 191 (similar to the subroutine 186) is performed. Then the 39 bit shift register 69 is prepared for its LFSR cycle in a series of steps 192. Specifically, the 5 low order bit positions are the exclusive OR of the command with the 5 low stages of the 19 bit shift register 54; the high 14 bits of the 19 bit shift register 54 are placed directly in the 39 bit shift register; and the highest order 20 bit positions are set equal to the 20 bit positions of the 20 bit shift register 53. The mask is set equal to the secret feedback mask for the 39 bit shift register, found in the PROM 19, and the C counter is set to 39. Then, an LFSR cycle subroutine 193 is performed, this time with 39 iterations, and the result restored in the 39 bit shift register embodied in the scratch pad memory 20. In a routine 194, the 16 bits of the fob ID from the PROM 19, the 39 encrypted bits now in the 39 bit shift register, the P/R bit, and the download bit are all transmitted serially while the calculation for error correcting code bits is performed. These are calculated and transmitted, to complete the process of a panic or resynch command transmission. Whether it be a panic or a resynch is determined by the status of the five command bits. If a resynch was performed, the new values of the 20 bit shift register and 19 bit shift register will be retained as the pseudorandom starting words to be used for future authentication of transmissions to the receiving module. But if this is a panic command, the new values are only used to ensure synchronized response, one time, and a test 195 causes the previous values of the 20 bit and 19 bit shift registers to be restored from the buffers in a step 196.

Assuming that a normal command has been given, a negative result of the test 180 reaches a series of steps 199 in which the working shift register is set equal to the 20 bit shift register in the RAM 20 (not the secret initial value), so as to take advantage of the pseudorandom number generated by all of the previous iterations. The mask for the shift register is set equal to the 20 bit shift register secret feedback mask from the PROM 19, and a random bit (which determines how many iterations are to be performed, similar to the gates 64 of FIG. 1) is set equal to whatever random bit has been selected to be used to control the iterations for the 20 bit shift register. This might, for instance, be the third or the ninth bit of the 20 bit shift register, or in a general case, can be anything else that is deterministically computable but difficult to predict. Then a test 200 determines what the random bit is: if a 1, a step 201 sets the C counter to 1; but if a 0, a test 202 sets the C counter to 2. Then, either a 1 iteration or 2 iteration LFSR cycle subroutine 203 is performed. This aspect of the invention may be used in prior art systems, such as in the Hill et al patent. Next, the same sort of operation is accomplished with the 19 bit shift register; a series of steps 204 set the working shift register equal to the content of the 19 bit shift register in the ram 20, the mask for the working shift register is set equal to the secret feedback mask for the 19 bit shift register in the PROM 19, and the random bit is set equal to whatever bit has been chosen to be random for the 19 bit shift register. Then a test 205 determines if the random bit is 1, or not. If it is, a step 206 sets the C counter to 3, and otherwise a step 207 sets the C counter to 2. This provides four iterations (201, 206; 202, 207) whether the random bit is 1 or 0; but it may be set in other ways, if desired. Then a 2 or 3 iteration LFSR cycle subroutine 191 is performed. Then the series of steps 192 set things up so as to form the 39 bit encrypted word, a 39 iteration LFSR cycle subroutine 193 is performed so as to produce the 39 bit encrypted word, and the subroutine 194 transmits all the bits together with a calculated error correction code. Thus, the differences between encrypting and transmitting normal commands and the panic/resynch command are the setting of the P/R bit, the use of the random counter 145, the use of the secret initial values and the particular code which is exclusive ORed into the 19 bit shift register 54.

When a command word has been transmitted by the subroutine 194, and if a panic command, the shift registers have been restored from the buffer, the program advances to a one-half second wait in a step 208. This is to ensure that successive button pressings which are independent of each other will occur no closer than one-half second apart. During the time from when the computer was awakened by a command interrupt (at test 172 until the end of the one-half second waiting period at step 208), a switch interrupt might have occurred as a result of a second pressing of one of the switches 12-15. As described hereinbefore, this is most likely the case of an attempt to press two switches at once (such as lock and unlock) to thereby cause a resynch. Whenever the switch interrupt is enabled, closing of one of the switches 12-15 will reach the interrupt subroutine of FIG. 4 through an entry point 209. In a series of steps 210, the particular switch which caused the present interrupt is remembered by being ORed into the switch word within the RAM 20; and since this may be a request for resynchronization, an internal resynch flag is set. The random counter is stopped, to provide the random number which is used in resynchronization, and then whatever part of the program of FIG. 3 was in process when the interrupt was sensed is returned to; this return may be to any of the functional steps ahead of the waiting step 208, or may be within the waiting step 208. Of course, if the waiting step 208 is interrupted, it will in fact turn out to be more than one-half second when the counting therefor is completed; this is irrelevant.

In FIG. 3, after the waiting period is over, a test 211 determines if the resynch flag has been set. If it has, an affirmative result of test 211 reaches a step 212 which resets the resynch flag, and then the program advances to the decode command subroutine 179. If the first switch which was pressed, turning on the computer, was either lock or unlock, and the second switch which was pressed, causing the switch interrupt, was either unlock or lock, respectively, then the decode command subroutine will in fact decode a resynch command, to cause a resynch operation of the type described hereinbefore. If not, any other two-key series may be decoded into a lock command for security, or into a panic command since the panic command will not affect security, or it could cause reversion to the one-half second waiting period, at step 208, or otherwise as suits any particular implementation of the invention. Of course, if two switches which can cause a resynch command are pressed essentially simultaneously, the decode command subroutine will decode a resynch command without the aid of FIG. 4 and the resynch flag. If switches are repetitively pressed at less than half-second intervals, the switch word will either contain gibberish or will simply repeat the resynch command.

After waiting one-half second at the step 208, if the resynch flag has not been set, a negative result of test 211 will cause a pair of steps 213 to return the switch word to all zeros and to disable the switch interrupt, so that all future operation of the switches can only turn on the computer from its stop condition, at test 172. It should be noted that the command interrupt and the switch interrupt respond to the same thing: the operation of any of the switches; the difference is the microprocessor's response to them, as is well known in the art.

It is assumed that the decryption of FIG. 5 is carried out in a microprocessor of the same general type as is used in the fob. When connected to a battery, the routine is entered through a power up transfer point 214 and the processor immediately goes into a stop mode at a step 215, where the clock is off and the only function is to respond to a receiver interrupt at a test 216. In between usages, the processor in the automobile will remain in the stop mode, in the loop 215, 216. When an incoming message is sensed, an affirmative result of the test 216 will reach a subroutine 217 which handles receiving all 64 bits of the word transmitted from a fob, calculating the error correcting code, and fixing any single error which can be fixed. Then a test 218 determines if the error correction code indicates correct data. If it does not, a negative result of test 218 reaches a transfer point 219 and then a step 220 where the program just waits for half of a second. The purpose of this is to severely hamper any attempts to break the code through repetitive application of numbers, with or without calculated likely candidates. After waiting one-half second, the processor returns to the stop mode in the loop 215, 216.

If the incoming word is OK, an affirmative result of test 218 reaches a step 221 where a working number, n, is set equal to 4 (or to such other number as the number of fobs which can be associated with the automobile). Then, a subroutine 223 compares all the bits of the incoming ID number to all the bits of the ID number for fob 4. If they are not equal, a negative result of a test 224 will reach a step 225 where n is decremented and a test 226 determines if all of the fobs have been checked or not. If they have, that means a signal has been received from a fob of another automobile by accident, or from some other unauthorized source. Therefore, an affirmative result of test 226 is taken to be a failure, and the wait step 220 is reached through the wait transfer point 219. Otherwise, the ID of another fob is checked in the subroutine 223. Assuming that the ID number matches for one of the fobs, another working number, N, is set equal to n so as to identify the words in the PROM and RAM needed for decryption, in a step 227. Since the received word may relate to a fob other than fob N, but having the same ID number, the shift register values for fob N are saved in a buffer, in a pair of steps 228, so they may be restored if authentication fails. This is also necessary since if a panic operation has been commanded, the iterations of the shift registers continue in a normal fashion, after performing the panic command. Then a test 229 determines if the P/R bit was present in the incoming word, or not. If it is present in the incoming word, the panic/resynch decrypt routine of FIG. 6 is reached through a transfer point 230.

Figure 6:
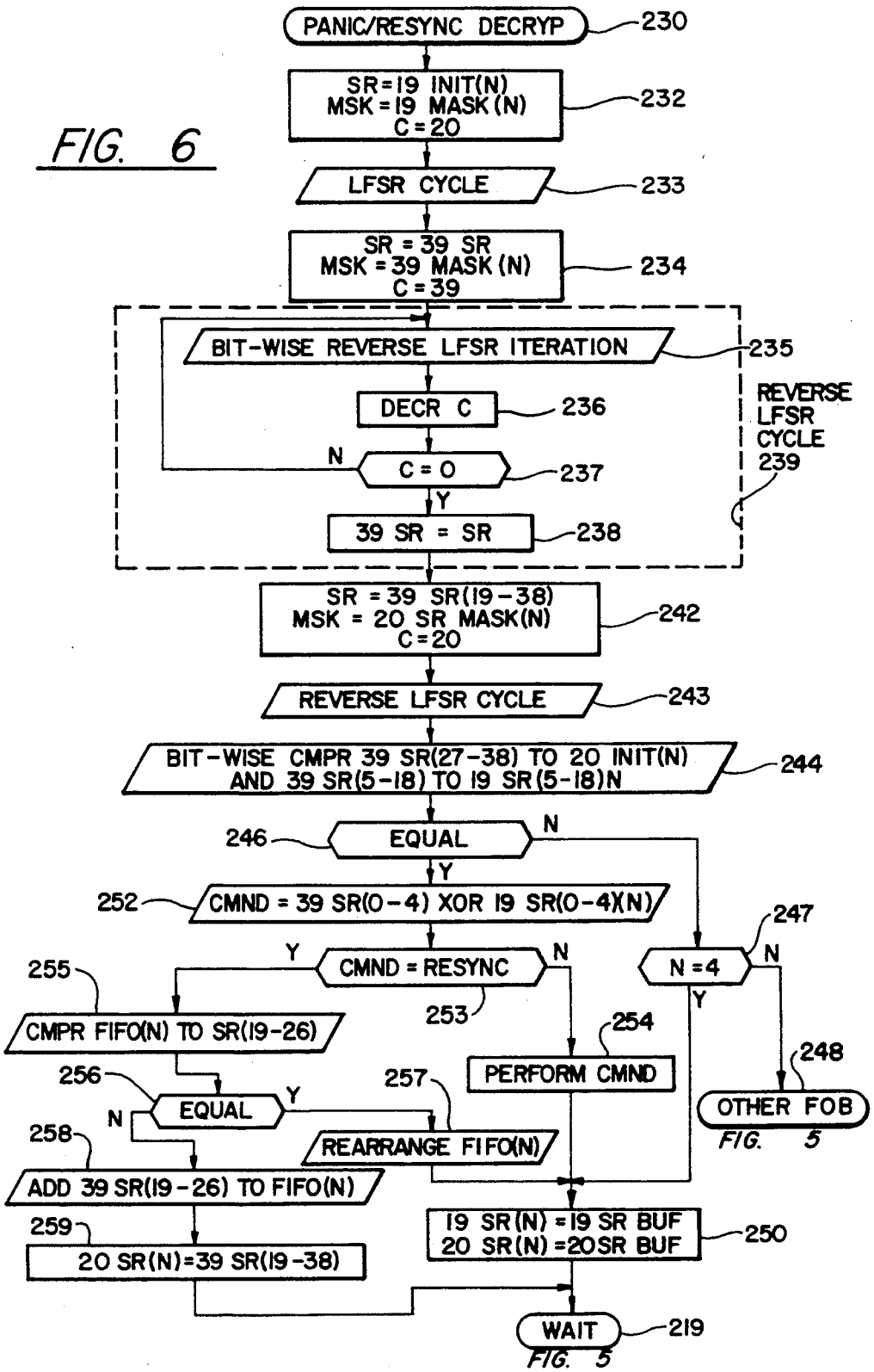
FIG. 6 is a logic flow diagram of a panic command or resynch command portion of a decryption routine according to the invention.

In FIG. 6, the first steps 232 set a main working shift register (SR) and its mask equal to the secret initial value and the secret feedback mask for the 19 bit LFSR, respectively, from the PROM 40 for the selected fob N, and a C counter is set equal to 20 so as to cause 20 iterations. Then, a 20 iteration LFSR cycle subroutine 233 is performed on the 19 bit shift register. It is assumed that the 39 bit encrypted word portion of the 64 bit received word 38 is stored immediately in a 39 bit shift register location within the RAM 41, which is where it now can be found. Then the 39 bit encrypted word, in the 64 bit word 38, and the 39 bit secret mask for the fob N are provided to the shift register and the C counter is set for 39 iterations, in step 234. Then, a bitwise reverse LFSR iteration subroutine 235 is performed which looks at the low order bit to determine whether the bits corresponding to the mask should be flipped before they are shifted to the next lower order position in the shift register to reconstitute the original word prior to encryption. After each iteration, the C counter is decremented in a step 236 and when all 39 iterations have been performed, an affirmative result of a test 237 will reach a step 238 wherein the content of the working shift register is stored in the 39 bit shift register in RAM 41. The steps and tests 235-238 comprise a reverse cycle subroutine 239, which recovers the initial unencrypted value of the concatenation in the 39 bit shift register 69 in the fob.

Bits 19-38 of the decrypted 39 bit shift register are now loaded into the working shift register in steps 242, the mask for the shift register is set equal to the 20 bit secret feedback mask for fob N from the EE PROM 40, and C is set equal to 20, and a 20 iteration, reverse LFSR cycle subroutine 243 is performed to recover the combined word (initial value plus random). In a subroutine 244, there is a bitwise comparison of the 39 bit shift register bits 27-38 with the twelve bits of the 20 bit secret initial value for fob N, from EE PROM 40, and of bits 5-18 of the 39 bit shift register with bits 5-18 of the 19 bit shift register for fob N, which are found in the RAM 41. This is equivalent to the comparison of the 12 high order bits on the trunk of lines 160 with those on the lines 161 and of the 14 bits on the line 128 with the 14 bits on the lines 129, in FIG. 2. If these are not equal, the decryption is unsuccessful, the attempted access is a failure, and a negative result of a test 246 will reach a test 247 to see if another fob could match the ID; if it might, FIG. 5 is reverted to through a transfer point 248, the shift registers for fob N are restored from the buffers in steps 249 (FIG. 5), and the process is repeated for another fob. If all fobs have had their ID's checked, the routine reaches a pair of steps 250 where the shift registers for fob N are returned to their former values, and the program enters the half second wait at step 220 through the transfer point 219.

If the comparison is successful, indicating partial authentication, an affirmative result of test 246 reaches a subroutine 252 where the value in the command register 138 is set equal to the exclusive OR of the low order bits of the 39 bit shift register and the low order bits of the 19 bit shift register, both taken from the RAM 41. Then, a test 253 determines if the panic/resynch bit was established in response to a resynch command. If not, the panic command is performed by turning on the lights, horn, or other alarm of the automobile in a step 254. Then, the shift registers for fob N are restored in the steps 250 and the wait step 220 is reached through the transfer point 219.

If the command were a resynch, a positive result of test 253 reaches a subroutine 255 which compares bits 19-26 of the 39 bit shift register (the regenerated random number) to a queue of previously used random numbers in the first in, first out stack (FIFO) 155, in EEPROM 40. If the random word compares to any of the last four (or whatever size FIFO is chosen) random words in the queue which were used in resynchronization, the resynchronization is deemed to be unsuccessful, since it is assumed that there has been clandestine playback of a copied random word. In such a case, an affirmative result of a test 256 reaches a subroutine 257 that rearranges the FIFO stack by moving the random word from its position in the queue in the FIFO stack to the first position thereof, and adjusting the position of the other words in the queue, without losing any. And, since this is deemed to be an unsuccessful attempt to resynchronize the unit, the old values in the 19 bit and 20 bit shift registers for fob N are restored in the steps 250. Then, the wait step 220 is reached through the transfer point 219.

If the random word did not compare with any word in the FIFO, a complete authentication exists, and a negative result of test 256 reaches a subroutine 258 which rearranges the FIFO for fob N simply by adding bits 19-26 of the 39 bit shift register to the first location in the queue and shifting all the other words downward therein, causing the oldest word to fall out. In this case, the resynch operation is successful, so the steps 250 are bypassed and the setting of the 19 bit shift register for fob N in RAM 20 is left as it was established by the resynchronization operation, at subroutine 233. The 20 bit LFSR word created in the subroutine 243 is placed in the RAM for fob N (step 259), for use en futuro.

An important aspect of the present invention is that resynchronization occurs only after: 20 iterations of the 19 and 20 bit shift registers from their secret initial values and the random number; performing 39 iterations in the 39 bit shift register with those values, and the exclusive OR of the command; reverse iterations of the 39 bit encrypted word in the receiver module; reverse iteration of the 20 bits which include the secret initial value of the 20 bit shift register and the random counter; generation and successful comparison of the high order bits of the 19 bit shift register; and a failure of comparison of the random word with any of the last four random words used to resynchronize the system. This is quite secure.

Figure 7:
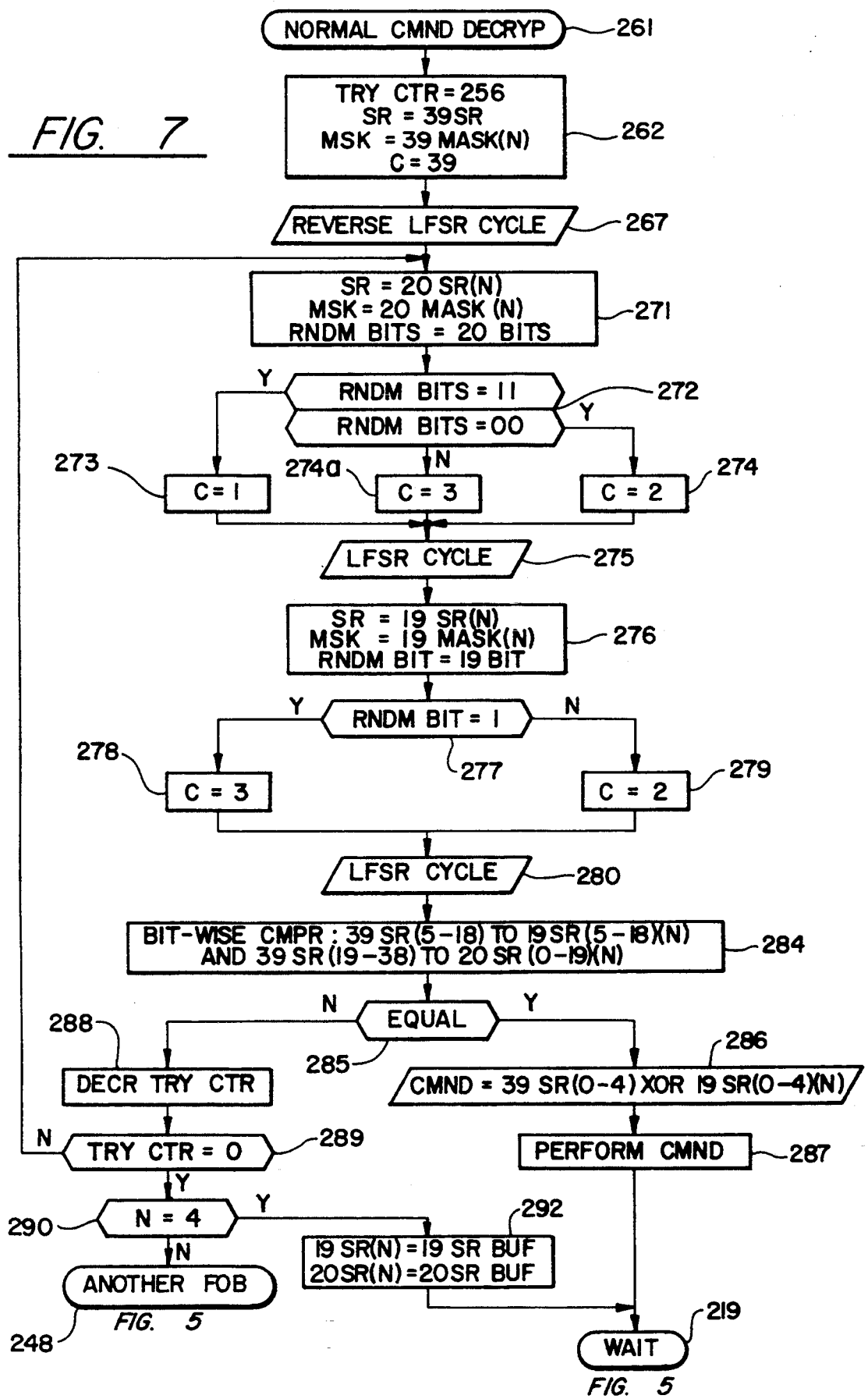
FIG. 7 is a logic flow diagram of a normal command authentication portion of a decryption routine according to the invention.

Assuming that there is no P/R bit 81 in the 64 bit word which is received, a negative result of test 229 in FIG. 5 will reach the normal command decryption routine of FIG. 7 through a transfer point 261. In the normal command decryption process, the iterated 19 bit and 20 bit words in the RAM 20 are given 1–3 additional iterations and compared with the reverse-processed bits of the 39 bit encrypted word. As described hereinbefore, since the fob may have its buttons pressed when the automobile cannot respond to it, they can become unsynchronized. Each time that a command is received in the receiver module 30, it is allowed 256 cycles to try to iterate to a correct pair of words that will match those which were transmitted to it. If it does so, then the command is responded to, and the iterated values are saved for authenticating the next command. If not, resynchronization is required, as described hereinbefore. In order to keep track of how many tries are made, the try counter 143 is set to its maximum count in a first one of a series of steps 262. Then, the working shift register (SR) is set equal to the 39 bit shift register in the RAM 20, which contains the 39 bit encrypted word. The mask for the shift register is set equal to the 39 bit secret feedback mask in the EE PROM 40, the C counter is set equal to 39, and a reverse LFSR cycle subroutine 267 is performed. Then a series of steps 271 cause the contents of the 20 bit shift register for fob N to be loaded from the RAM 41 into the working shift register (SR), the mask for the shift register is set equal to the secret feedback mask for fob N in the EE PROM 40 and a random bit is set equal to whatever bit has been chosen for the 20 bit shift register (as described with respect to steps 199 in FIG. 3). Then the random bit is tested in a step 272, and if it is a 1, the C counter is set equal to 1 (step 273), whereas if it is a 0, the C counter is set equal to 2 (step 274). Then, an LFSR cycle subroutine 275 is performed. Then a series of steps and tests 276–279 prepare to run an LFSR cycle subroutine 280 for the 19 bit shift register in a similar fashion. Then a subroutine 284 does bit-by-bit comparisons of the 39 bit shift register to the 20 bit shift register and to the high order bit positions of the 19 bit shift register, for fob N. If all the bits are equal, an affirmative result of a test 285 causes the particular command to be found by exclusive ORing the 5 low order bits in a subroutine 286 and the command is performed in a step 287, such as locking or unlocking the door, or releasing the trunk lid. But if the bits do not compare, a negative result of test 285 reaches a step 288 where the try counter is decremented and a test 289 to determine if 256 tries have been made yet. If not, another pair of iterations 275, 280 are performed and compared. This goes on until the receiver module 30 catches up with the fob 16 (if it can). If after 256 tries, a comparison has not been reached, an affirmative result of test 289 will reach a test 290 to see if all the fobs have been given consideration. If not, the restoration steps 249 (FIG. 5) are reached through the transfer point 248. Otherwise, the shift registers for fob N are restored to their starting values in steps 292 and the program reverts to the wait step 220 (FIG. 5) through the transfer point 219.

Figure 8:
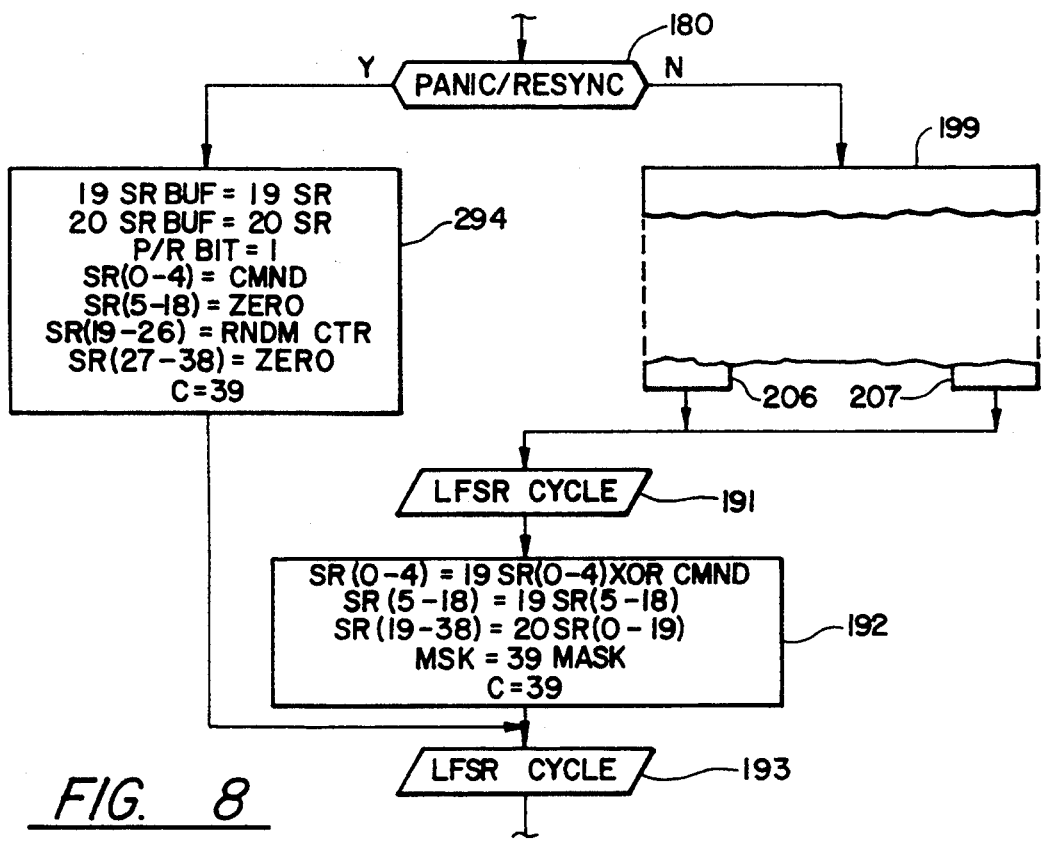
FIG. 8 is a fragmentary logic flow diagram of an alternative to the encryption routine of FIG. 3.

As described hereinbefore, the encrypted authorization that enables resynchronizing the receiver to the transmitter (and the panic alarm) is achieved by combining the purely random number from the random counter with the eight bits of the 20 bit shift register secret initial value, encrypting those with a 20 iteration LFSR operation, concatenating that with the encrypted 19 bit secret initial value having the command bits exclusive ORed in the low order thereof, and encrypting the combined word with 39 iterations of LFSR operation. One aspect of the invention is utilizing, for authentication, the truly random number from the random counter encrypted directly (without concatenation and the second layer of encryption) with any initial secret word, which may be a secret initial value of the type described hereinbefore, or may even be all zeros. FIG. 8 illustrates this simple authentication process in which the steps 181–190 (FIG. 3) are not performed at all, and instead a series of steps 294 set up the shift register for a 39 bit encryption operation by setting bits 5–18 and 27–38 to 0, and bits 0–4 being set directly by the command. Bits 19–26 are set equal to the random counter. In this way, the bits of the random counter and the bits of the command are totally mixed through the 39 iterations of an LFSR cycle performed in the subroutine 193.

Figure 9:
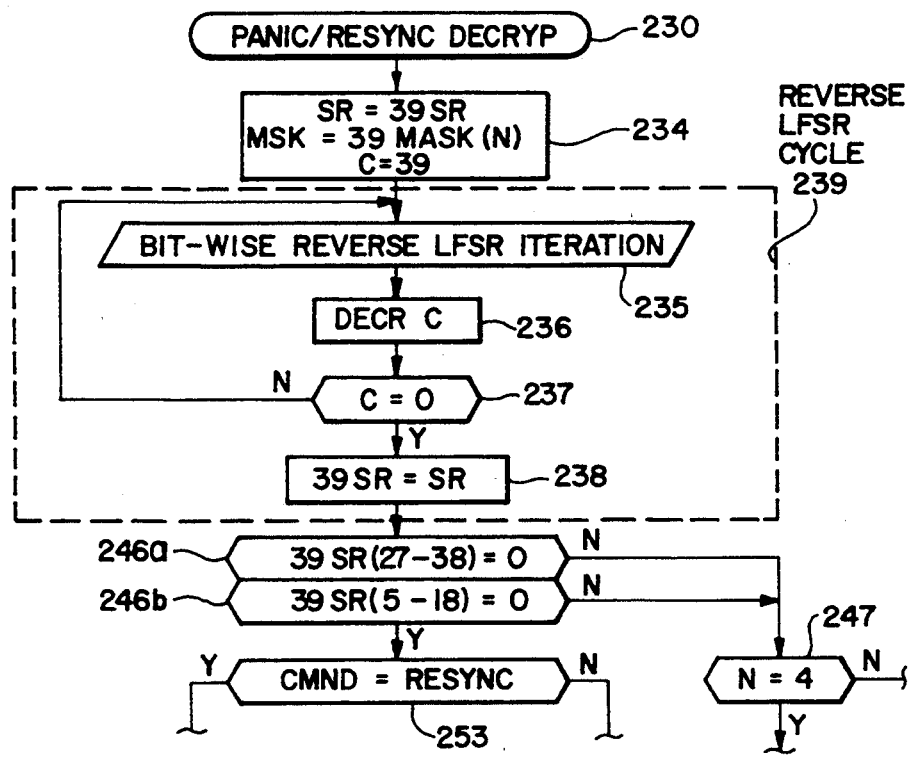
FIG. 9 is a fragmentary logic flow diagram of an alternative to the decryption routine of FIG. 6.

To effect simple decryption in this embodiment, as shown in FIG. 9, the steps 232, subroutine 233, steps 242, and subroutine 243 are all eliminated, and the subroutine 244 and test 246 are exchanged for a pair of simple tests 246a, 246b which just ensure that the decryption operation restores the zero fields of the original word (those set up in the steps 294 of FIG. 8). This means that the encryption and decryption have been done with the same number of iterations, utilizing the same mask (the 39 bit mask for transmitter N). Of course, the interception of a number of transmissions of this simple variety would be much easier to analyze to advantage in compromising the authentication process, than is the case for the embodiment described with respect to FIGS. 3 and 6, hereinbefore. However, the embodiment of FIGS. 8 and 9 illustrate that this aspect of the invention can be practiced with a single layer of encryption (rather than two layers as in the embodiment of FIGS. 3 and 6) and that the command and random number can be utilized in different ways than in the embodiment of FIGS. 3 and 6. Specifically, the authentication can be achieved without concatenating another number to a number which contains or is derived from the random number (as is the case in the embodiment of FIGS. 3 and 6). The embodiment of FIGS. 8 and 9 is generally illustrative of the kinds of changes which may be made in the embodiment of FIGS. 3–7, while still practicing important aspects of the present invention.

In a system which uses only one or two fobs, or in which speed of response is not important, the present invention may be utilized without the use of ID numbers, simply by trying all of the sets of stored shift register words and masks; this would make the system subject to more nuisance iterations since the ID number would no longer screen out many transmissions from similar, unauthorized systems. And there must be some sort of a tag to correlate the generated pseudorandom words with the correct feedback mask for subsequent iterations, as well as with the correct initial value. This may be achieved by arbitrary numbering of the various sets of initial values and masks and corresponding registers for storing the iterated words.

The various number of iterations used during synchronization may be the same (e.g., 20, or more) for both random words generated from initial values, or they may be different (e.g., 20 and 19, or more).

As used herein, the term "encryption" inherently defines a process capable of decryption. Thus, if the process of encryption employs a pseudorandom number generation operation of any type, that generation operation must be capable of being practiced in reverse, such as the reverse LFSR operation utilized herein. The encryption processes and operations used herein may be any of those described hereinbefore by way of example, and others. However, the LFSR pseudorandom number generation operation is one of the easier ones to understand, and probably the simplest to implement in dedicated or quasi-dedicated hardware. That is, if the signal processing means of the invention includes dedicated shift registers and the like as may be implied in FIGS. 1 and 2, the LFSR form of encryption may be preferred. Similarly, if the signal processing means of the present invention is implemented with microprocessors having suitable program routines as disclosed in FIGS. 3–7 herein, the advantage of LFSR operations over other forms of encryption may be less distinct. The term "encryption" is, therefore, used herein in its broadest sense, so long as the word which becomes encrypted can be recovered through decryption.

In the foregoing embodiments, secret initial values and secret feedback masks for generating maximal length sequences of pseudorandom numbers are essentially unique to each transmitter, but not necessarily totally unique. By this it is meant that the sets of two secret initial values and three secret feedback masks, taken together, are capable of distinguishing more vehicles than are made in a lifetime; however, the method of assignment, or human error or design, could result in some few with the same set of numbers. Within this definition, however, it is quite possible that several transmitters will have the same 19 bit secret initial value and/or the same 20 bit secret mask, or other similar combinations. In contrast, the use of a 16 bit identification number means that there will be several fobs each year possibly having the same identification number (but not the same secret values) so that over a course of time, there could be many fobs (such as about 5,000 fobs in the USA over a 10-year period for each possible identification number). Within statistical probability, it is possible that as many as one out of 10,000 automobiles having four fobs each may have two fobs with the same identification number. It is an important aspect of the present invention, that even if one fob having a correct identification number is not authenticated within 256 tries (or whatever is used), it will nonetheless try any other fob that may have the same ID number. If trying three or four fobs results in too much delay, the last fob tried is likely to be reported as faulty, and a new fob issued, with very minuscule likelihood that the new fob would have the same identification number as the remaining fobs in the set.

Although the present invention employs only lock-related commands, the panic alarm command, and synchronization command, it should be understood that the invention can be utilized to authenticate conveyance of any information in the form of bits similar to the command bits herein. Thus, in its broadest sense, the term "lock-related command" means the conveying of other than a synchronization command, the conveyance of which is to be authenticated; this may then be thought of as a command apart from the internal functioning of the system itself.

In the present embodiment, each encryption (such as the 19 bit, the 20 bit and the 39 bit shift register encryptions) are the same (linear feedback shift register pseudorandom number generation). However, they need not all be the same, and in fact can be different algorithms to further confuse any attempted analysis. Similarly, the number of bits in the shift registers can be whatever is desired. In all cases, the greater number of bits, the harder to break the code by analysis. The numbers used herein provide a safe system, but greater or fewer numbers of bits may be chosen in practicing the invention if desired. Similarly, the words may be considered to be single words, or double words in the sense that the 19 bit shift register produces one portion of 14 bits which is used for cryptographic authentication, and another portion which carries the command but is not used in cryptographic comparison for authentication, These portions can be considered to be two different words except for the fact that in the embodiment herein they are generated in the same process. Of course, separate processes could be used, or two processes of a different split of numbers of bits could be used to encrypt and iterate the encryption of the word in which the command bits are found. For instance, in place of a single 19 bit shift register operation, a 10 bit shift register operation and a 9 bit shift register operation could be utilized, the results thereof concatenated, and five command bits exclusive ORed into a portion of one of them, before being used in the final encryption.

The invention may use more than two concatenated words in the final encryption, such as an additional word or such as having three words, each slightly smaller than the two words used in the final 39 bit encryption herein.

The invention is disclosed as being employed in system in which the transmitter transmits to the receiver, but the receiver does not transmit back to the transmitter. However, the precepts of the present invention can be used singularly, or in combinations in systems which, for one purpose or another, employ bilateral communications between the two units. Aspects of the invention may then be used to authenticate transmissions in both directions, or only in one direction, as is necessary. Although the invention is disclosed herein, and may find its greatest utilization, in a remote authentication system, it may as well be used in a system in which the transmitter is connected by a conductor to the receiver, so as to provide secure operation between the two. Similarly, aspects of the invention may be utilized in contact embodiments, such as in electronic keys, so as to provide insurance against the temptation of insiders to perform a clandestine system breach, as well as protecting against outsiders compromising the system.

In the present embodiment, since the 19 and 20 bit shift register words are encrypted in the 39 bit shift register operation, it is not necessary to perform resynchronization of the receiver to a transmitter when that transmitter has just been downloaded to the receiver. That is, the command word will be sufficiently scrambled utilizing the new secret initial values and a random word without independently scrambling the 19 and 20 bit shift registers before concatenation thereof. Of course, this means that the 12 bits of the 20 bit shift register will be accompanied by eight zero valued bits when entered into the 39 bit shift register operation; this may be deemed to be too risky in some cases.

In the present invention, the panic alarm uses temporary resynchronization for authentication. The purpose is to ensure a minimal amount of nuisance alarms (probably zero) while at the same time ensuring that the alarm will sound rapidly, even though the receiver may be far out of synch from the transmitter.

In the present resynchronization embodiment, only four words are used in the first in, first out memory. In fact, comparison with one prior random number will always be sufficient unless a thief records more than one resynch message. If a greater degree of security is desired for a resynchronization operation, a longer FIFO queue may be utilized. However, this could result in more occurrences of the random number having previously been received, which slows down response (requiring several attempts to resynchronize) which in turn can cause a certain degree of customer dissatisfaction. On the other hand, the resynchronization itself is not nearly as risky as the lock-related command transmissions, in terms of assisting in the clandestine breach of the system. The synchronization of the present invention (along with other features of the present invention) may be employed in prior art systems, such as in the Hill and Finn patent; therein, authentication before resynchronization could occur between test 350 and step 351. Use of the random word for authenticating resynchronization is disclosed herein; however, the random word form of authentication, both as disclosed in FIGS. 3 and 6 as well as in FIGS. 8 and 9 may be used for authenticating lock-related and other, entirely different commands.

In the present invention, whenever a comparison of a currently received random number with the random numbers in the FIFO queue is successful, the queue is rearranged so as to put the current random number at the head of the queue (thereby ensuring it will be retained for the longest period of time). While this is the preferred and safest embodiment, it is not necessary and may be omitted if desired in any embodiment of the invention. As disclosed herein, the encrypted concatenation of the random word with the 12 bit secret initial value is utilized as the starting word in the receiver following resynchronization. If desired, however, the random number and the secret initial value could be used as the starting number, following synchronization. Or, the random number could be used alone, in which case the 12 bit secret initial value associated with the 20 bit shift register operation would be functional only during resynchronization.

The use of the exclusive OR function to carry the command bits through the encryption process is advantageous because it requires only a small amount of processing to avoid requiring more transmitted bits (just for the command) or, in the alternative, diluting the sophistication of the encryption. However, other aspects of the invention may be practiced without exclusive ORing the command or any other bits into words to be encrypted.

The random numbers generated herein is a function of the amount of time between pressing a pair of switches when two switches have to be pressed in order to cause the command which requires the random number. However, the random number can be generated in any other desired fashion, many of which are known in the art.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A method of cryptographically authenticating a transmission from a transmitting unit at a receiving module, comprising:
   providing a secret initial value in said transmitter and providing said secret initial value in said receiver;
   in said transmitting unit:
   generating a random number;
   concatenating said random number with a key word derived from said secret initial value to provide a combined word;
   performing an encryption operation on said combined word to provide an encrypted number; and
   transmitting a command word derived at least in part from said encrypted number and indicative of a command;
   comprising in said receiving module:
   receiving said command word;
   recovering said encrypted number from said received command word;
   performing a decryption operation on said recovered encrypted number to recover said combined word;
   comparing a second word derived from said secret initial value with the key word portion of said recovered combined word;
   storing the random number portion of said recovered combined word for future use in subsequent authentication operations;
   comparing the random number portion of said recovered combined word with a previously stored random number portion; and
   performing the command indicated by said command word only if said second secret initial value is identical to the initial value portion of said recovered combined word and said random number portion of said recovered combined word is different from said previously stored random number portion.

2. A method according to claim 1 wherein said step of comparing the random number portion is performed only if said second secret initial value is identical to said initial value portion of said recovered combined word.

3. A method according to claim 1 wherein said step of storing is performed after said step of comparing the random number portion, said random number is stored at the head of a queue in a first-in, first-out memory, the first recovered one of said previously stored random numbers being dropped only if said step of comparing indicates that said random number portion is different.

4. A method according to claim 1 wherein said step of storing comprises storing the random number portion of said recovered combined word until at least four subsequent authentication operations have been performed; and said step of comparing the random number portion comprises comparing with four of said previously stored random number portions.

5. A method according to claim 1 wherein said secret number is zero.

6. A method according to claim 1 wherein said secret number is a non-zero number.

7. A method according to claim 1 wherein said command indicated by said command word is a synchronization command, performance of which provides cryptographic synchronization between said receiving module and said transmitting unit.

8. A method according to claim 7 comprising:
in said transmitting unit, storing one of said numbers for future use in subsequent authentication; and wherein
said step of performing said command comprises storing said one of said numbers for future use in subsequent authentication.

9. A method according to claim 8 wherein said one of said numbers is said encrypted number.

10. A method according to claim 1 wherein said step of performing an encryption operation comprises performing a linear encryption operation.

11. A method according to claim 1 wherein said step of performing an encryption operation comprises performing a feedback shift register operation.

12. A method according to claim 11 wherein said step of performing an encryption operation comprises performing a linear feedback shift register operation employing the same secret initial value and the same secret feedback mask in said transmitting unit as in said receiving module.

13. A method according to claim 12 wherein said linear feedback shift register operation comprises a number of iterations on the order of the degree of said combined word or more.

14. A method according to claim 1 comprising:
encrypting the concatenation of said encrypted number with a third word to provide an encrypted word; and wherein
said step of transmitting comprises transmitting said command word including said encrypted word; and
said step of recovering said encrypted number comprises performing a decryption operation on said encrypted word, to also recover said third word.

15. A method according to claim 14 wherein said third word provides said indication of a command.

16. A method according to claim 14 wherein said third word is derived from a third secret initial value.

17. A method according to claim 14 wherein said third word comprises a third secret initial value having command indicating bits exclusive ORed into a command portion thereof; and
comprising in said receiving module:
comparing the non-command portion of said recovered third word with a corresponding portion of a fourth secret initial value; and
exclusive ORing said command portion of said recovered third word with a corresponding portion of said fourth secret initial value to recover said command indicating bits only if said second initial value is identical to the initial value portion of said recovered combined word, and said non-command portion of said recovered third word is identical to said corresponding portion of said fourth secret initial value.

18. A method according to claim 14 wherein said steps of encrypting and of performing an encryption operation each comprise performing a linear encryption operation.

19. A method according to claim 14 wherein said steps of encrypting and of performing an encryption operation each comprise performing a feedback shift register operation.

20. A method according to claim 19 wherein said steps of encrypting and of performing an encryption operation each comprise performing a linear feedback shift register operation.

21. A method according to claim 1 wherein said command indicated by said command word is a panic command, and performance of said panic command sets off an alarm.

22. A method according to claim 21 wherein said alarm comprises the horn of a vehicle with which said receiving module is associated.

23. A method according to claim 21 wherein said alarm comprises the headlights of a vehicle with which said receiving module is associated.

24. A method according to claim 1 wherein the random number portion of said combined word is compared with a plurality of previously stored random number portions.

25. A method according to claim 1 wherein said key word is said secret initial value.

26. A method of cryptographically synchronizing a command transmitting unit with a command performing receiving module for selective response thereto, comprising:
providing, in both said transmitting unit and in said receiving module, a word including a key portion derived at least in part from a secret initial value;
in said transmitting unit:
performing an encryption operation on said word to provide an encrypted word; and
transmitting a command word derived at least in part from said encrypted word and indicative of a synchronization command;
comprising in said receiving module:
receiving said command word;
recovering said encrypted word from said received command word;
performing a decryption operation on said recovered encrypted word to recover said word;
comparing the key portion of said word with the key portion of said recovered word; and
providing cryptographic synchronization between said receiving module and said transmitting unit only if the key portion of said word is identical to the key portion of said recovered word.

27. A method according to claim 26 wherein said word comprises a random number concatenated with said key portion, said decryption operation recovers said random number, and said step of providing cryptographic synchronization is performed only if said recovered random number is different from a previous random number recovered from a received command word.

28. A method according to claim 26 wherein said word comprises said key portion and a third secret initial value having bits indicative of a synchronization command exclusive ORed into a command portion thereof; and said step of providing cryptographic synchronization comprises exclusive ORing a fourth secret initial value into the command portion of said recovered word to recover said synchronization command bits and providing cryptographic synchronization in response to said recovered synchronization command bits.

29. A method according to claim 26 wherein said key portion is said secret initial value.

30. A method according to claim 26 wherein said step of providing cryptographic synchronization comprises storing said recovered encrypted word for future use in subsequent authentication.

31. A method of transferring a cryptographically authenticated command from a transmitting unit to a receiving module, comprising:

providing, in both said transmitting unit and in said receiving module, a code word, derived from a secret initial value, including a key portion and a command portion;

comprising, in said transmitting unit:

providing a plurality of bits indicative of a command to be transmitted;

exclusive ORing said plurality of bits into corresponding bits of said command portion to provide an altered word;

performing an encryption operation on a word including said altered word to provide an encrypted word; and transmitting a command word derived at least in part from said encrypted word;

comprising in said receiving module:

receiving said command word;

recovering said encrypted word from said received command word;

performing a decryption operation on said recovered encrypted word to recover said altered word; and exclusive ORing the command portion of said code word with the command portion of said recovered altered word to recover said plurality of bits.

32. A method according to claim 31 comprising:

exclusive ORing the command portion of said code word with the command portion of said recovered altered word only if said key portion of said code word is identical to said key portion of said recovered altered word.

33. A cryptographically authenticated control system in which a command message from a transmitting unit causes a physical effect in a receiving module;

said transmitting unit comprising:

a source of signals for providing a seed signal indicative of a secret initial value, said initial value being essentially unique to said transmitting unit;

command switches that indicate a physical effect to be caused by said receiving module; and first signal processing means responsive to selected operation of said switches indicative of a command for providing a random signal indicative of a variable random number, for providing a combined number including a key word derived from said secret initial value concatenated with the random number defined by said random signal, for encrypting said combined number, and for transmitting, to said receiving module, a command word signal having a key portion derived from the encrypted combined number and including an indication of said command;

said receiving module comprising:

a signal source for providing a seed signal indicative of said secret initial value; and second signal processing means for receiving said command word signal, for recovering said encrypted combined number from said key portion of said received command word signal, for decrypting said recovered encrypted combined number so as to recover said combined number, for providing a key word derived from said secret initial value, for comparing said key word with an equivalent portion of said recovered combined number, for storing, in response to said initial value being identical to said equivalent portion, the random number portion of said recovered combined word for subsequent use, and for comparing said random number portion, for which said equivalent portion is equal to said key word, with a similar random number portion, previously stored for subsequent use in response to a prior key word comparison, and for selectively performing the command indicated by said command word only if said compared random number portions are not equal.

34. A system according to claim 33 wherein:

said command switches indicate a synchronization command;

said first signal processing means comprises means responsive to said switches indicating said synchronization command for storing one of said numbers for future use in subsequent generation of encrypted messages; and said second signal processing means comprises means for performing said synchronization command by storing said one of said numbers recovered from said command word for future use in authenticating subsequently received messages.

35. A system according to claim 34 wherein said first and second signal processing means each comprise means for storing said encrypted combined number for future use in authenticating subsequently received messages.

36. A system according to claim 33 wherein said key word is said secret initial value.

37. A system according to claim 33 wherein said second signal processing means compares said random number portion with a plurality of previously stored similar random number portions.

38. A method of causing an alarm at a receiving module in response to a command from a transmitting unit, comprising:

providing, in both said transmitting unit and in said receiving module, a word including a key portion derived at least in part from a secret initial value;

in said transmitting unit:

performing an encryption operation on said word to provide an encrypted word; and transmitting a command word derived at least in part from said encrypted word and indicative of an alarm command;

comprising in said receiving module:

receiving said command word;

recovering said encrypted word from said received command word;

performing a decryption operation on said recovered encrypted word so as to recover said word;

comparing the key portion of said word with the key portion of said recovered word; and setting off an alarm near said receiving module if the key portion of said word is identical to the key portion of said recovered word.

39. A method according to claim 38 wherein said alarm comprises the horn of a vehicle with which said receiving module is associated.

40. A method according to claim 38 wherein said alarm comprises the headlights of a vehicle with which said receiving module is associated.

* * * * *